United States Patent
Ito et al.

(10) Patent No.: US 10,696,125 B2
(45) Date of Patent: Jun. 30, 2020

(54) VEHICLE AIR CONDITIONER

(71) Applicants: DENSO CORPORATION, Kariya, Aichi-pref. (JP); SOKEN, INC., Nishio, Aichi-pref. (JP)

(72) Inventors: Koji Ito, Kariya (JP); Yasuhiko Niimi, Kariya (JP); Jun Yamaoka, Kariya (JP); Takashi Saitou, Nishio (JP)

(73) Assignees: DENSO CORPORATION, Kariya, Aichi-pref. (JP); SOKEN, INC., Nisshin, Aichi-pref. (JP)

( * ) Notice: Subject to any disclaimer, the term of this patent is extended or adjusted under 35 U.S.C. 154(b) by 248 days.

(21) Appl. No.: 15/770,310

(22) PCT Filed: Aug. 26, 2016

(86) PCT No.: PCT/JP2016/074963
§ 371 (c)(1),
(2) Date: Apr. 23, 2018

(87) PCT Pub. No.: WO2017/073154
PCT Pub. Date: May 4, 2017

(65) Prior Publication Data
US 2018/0312029 A1    Nov. 1, 2018

(30) Foreign Application Priority Data
Oct. 26, 2015    (JP) .................. 2015-209985

(51) Int. Cl.
*B60H 1/00* (2006.01)
*B60H 1/03* (2006.01)

(52) U.S. Cl.
CPC ..... *B60H 1/00064* (2013.01); *B60H 1/00842* (2013.01); *B60H 1/00849* (2013.01);
(Continued)

(58) Field of Classification Search
CPC .............. B60H 1/0064; B60H 1/00842; B60H 1/00849; B60H 1/034; B60H 1/00471;
(Continued)

(56) References Cited

U.S. PATENT DOCUMENTS

2013/0059522 A1    3/2013  Ota et al.
2014/0034266 A1*   2/2014  Tabei ................. B60H 1/00764
                                                                165/42

(Continued)

FOREIGN PATENT DOCUMENTS

JP     S59040916 A    3/1984
JP     H05069732 A    3/1993
(Continued)

*Primary Examiner* — Joel M Attey
(74) *Attorney, Agent, or Firm* — Harness, Dickey & Pierce, P.L.C.

(57) ABSTRACT

A vehicle air conditioner includes a casing, a heater core that heats an air flow by heat exchange between the air flow and a heat medium, an electric heater that heats an air flow by an electric power, and a determiner that determines whether a temperature of the heat medium is equal to or lower than a predetermined temperature. When the determiner determines that the temperature of the heat medium is equal to or lower than the predetermined temperature, an air flow introduced into a casing is heated by the electric heater and flows toward the vehicle interior without passing through the heater core.

13 Claims, 10 Drawing Sheets

(52) U.S. Cl.
CPC ......... *B60H 1/034* (2013.01); *B60H 1/00471* (2013.01); *B60H 2001/00128* (2013.01); *B60H 2001/00135* (2013.01); *B60H 2001/00171* (2013.01)

(58) Field of Classification Search
CPC ........... B60H 2001/00128; B60H 2001/00135; B60H 2001/00171
USPC ....................................................... 165/202
See application file for complete search history.

(56) References Cited

U.S. PATENT DOCUMENTS

2016/0144685 A1 5/2016 Ochiai et al.
2018/0361819 A1* 12/2018 Ryu ................... B60H 1/00064

FOREIGN PATENT DOCUMENTS

| JP | 2010000904 A | 1/2010 |
|---|---|---|
| JP | 2013018420 A | 1/2013 |
| JP | 2013052750 A | 3/2013 |
| JP | 5310736 b2 | 10/2013 |
| JP | 2015037926 A | 2/2015 |
| JP | 2015116963 A | 6/2015 |

* cited by examiner

VEHICLE AIR CONDITIONER

CROSS REFERENCE TO RELATED APPLICATIONS

This application is a U.S. National Phase Application under 35 U.S.C. 371 of International Application No. PCT/JP2016/074963 filed on Aug. 26, 2016 and published in Japanese as WO 2017/073154 A1 on May 4, 2017. This application is based on and claims the benefit of priority from Japanese Patent Application No. 2015-209985 filed on Oct. 26, 2015. The entire disclosures of all of the above applications are incorporated herein by reference.

TECHNICAL FIELD

The present disclosure relates to a vehicle air conditioner.

BACKGROUND ART

Up to now, as a heat exchanger for a vehicle air conditioner, a heat exchanger in which an electric heater that heats an air flow by an electric power is disposed in a part of a core that heats the air flow by an engine coolant water has been known. For example, such a heat exchanger is disclosed in Patent Literature 1.

PRIOR ART LITERATURE

Patent Literature

Patent Literature 1: JP H05-069732 A

SUMMARY

The present inventors have studied that the heat exchanger of Patent Literature 1 is placed in an air conditioning case and an air flow heated by a core and an electric heater is blown from the air conditioning case into a vehicle interior, to thereby enhance a heating capacity in the vehicle air conditioner after starting an engine.

As described above, the core heats the air flow with use of the engine coolant water. Therefore, when the engine coolant water after starting the engine is low in temperature, the air flow is cooled by the engine coolant water when the air flow passes through the core, and a cold air is blown out from the core. For that reason, even if the electric heater heats the air flow, when the temperature of the engine coolant water is low, the temperature of the air flow blown out from the heat exchanger cannot be increased to a sufficient temperature.

Therefore, the vehicle air conditioner may be configured so that after the air flow heated by the electric heater has been blown into the vehicle interior from the air conditioning case, the air flow is introduced into the air conditioning case through an inside air introduction port, and the air flow is again repetitively heated with the electric heater.

In that case, although the air temperature blown out from the air conditioning case into the vehicle interior can be increased, it takes a long time to raise the temperature of the air blown out from the air conditioning case into the vehicle interior to a sufficient temperature.

It is an object of the present disclosure to provide a vehicle air conditioner that blows a hot air into a vehicle interior even when a temperature of a heat medium corresponding to an engine coolant is low.

According to an aspect of the present disclosure, a vehicle air conditioner includes: a casing configured to allow an air flow introduced from an air introduction port to pass through the casing toward a vehicle interior; a heater core configured to heat the air flow by heat exchange between the air flow in the casing and a heat medium; an electric heater configured to heat the air flow introduced into the casing from the air introduction port by an electric power; and a determiner configured to determine whether a temperature of the heat medium is equal to or lower than a predetermined temperature based on a detection value of a temperature sensor that detects the temperature of the heat medium.

When the determiner determines that the temperature of the heat medium is equal to or lower than the predetermined temperature, the air flow introduced into the casing from the air introduction port flows toward the vehicle interior without passing through the heater core, and the air flow heated by the electric heater flows toward the vehicle interior.

According to the above configuration, when the temperature of the heat medium is equal to or lower than the predetermined temperature, the air flow introduced into the casing from the air introduction port flows toward the vehicle interior without passing through the heater core, and the air flow heated by the electric heater flows toward the vehicle interior. Therefore, even when the temperature of the heat medium is low, a hot air can be blown out from the casing into the vehicle interior.

According to another aspect of the present disclosure, a vehicle air conditioner includes a casing configured to allow an air flow introduced from an air introduction port to pass through the casing toward a vehicle interior; a heater core configured to heat the air flow by heat exchange between the air flow in the casing and a heat medium; an electric heater configured to heat the air flow introduced into the casing from the air introduction port by an electric power; and a determiner configured to determine whether a temperature of the heat medium is equal to or lower than a predetermined temperature based on a detection value of a temperature sensor that detects the temperature of the heat medium.

The casing includes a bypass flow channel configured to allow the air flow introduced from the air introduction port to bypass the heater core and flow toward the vehicle interior through the bypass flow channel.

When the determiner determines that the temperature of the heat medium is equal to or lower than the predetermined temperature, the air flow introduced into the casing from the air introduction port is regulated such that a flow rate of an air flow passing through the bypass flow channel toward the vehicle interior is larger than a flow rate of an air flow passing through the heater core toward the vehicle interior.

According to the above configuration, when the temperature of the heat medium is equal to or lower than the predetermined temperature, most of the air flow introduced into the casing from the air introduction port flows toward the vehicle interior without passing through the heater core, and the air flow heated by the electric heater flows toward the vehicle interior. Therefore, even when the temperature of the heat medium is low, a hot air can be blown out from the casing into the vehicle interior.

DESCRIPTION OF EMBODIMENTS

Figure 1:
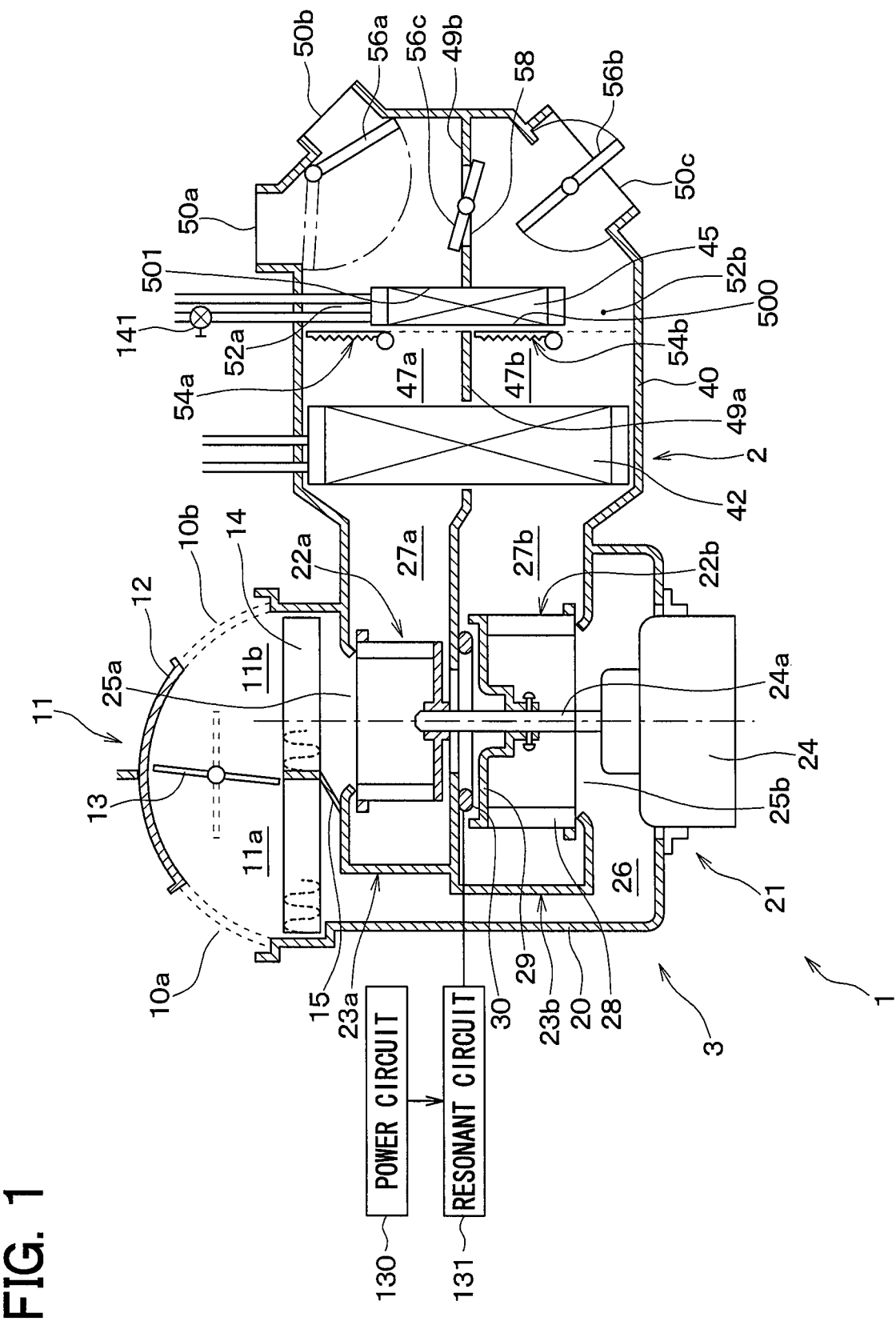
FIG. 1 is a cross-sectional view showing a configuration of a vehicle air conditioner according to a first embodiment.

Hereinafter, embodiments will be described referring to drawings. For purposes of simplification of explanation, portions which are the same as or equivalent to each other among the following respective embodiments are assigned the same reference numeral in the drawings.

First Embodiment

FIG. 1 is a cross-sectional view of a vehicle air conditioner 1 according to a first embodiment. A ventilation system of the vehicle air conditioner 1 according to the present embodiment is roughly divided into an air conditioning unit 2 and a blower unit 3. The blower unit 3 is disposed so as to be offset from a center portion toward a front passenger seat side in a lower portion of an instrument panel in a vehicle interior. On the other hand, the air conditioning unit 2 is disposed in a substantially center portion in a right and left direction in the lower portion of the instrument panel in the vehicle interior.

The blower unit 3 includes an inside-outside air switch box 11 having an inside air introduction port (that is, an air introduction port) 10a and an outside air introduction port 10b. The inside air introduction port 10a is an opening for introducing a vehicle interior air (hereinafter referred to as inside air). The outside air introduction port 10b is an opening through which a vehicle exterior air (hereinafter referred to as outside air) is introduced. The air in the vehicle interior is an air in a space where seats are disposed, outside the air conditioning unit 2 and the blower unit 3 in the vehicle interior.

The blower unit 3 is provided with an inside-outside air switch door 12 and a partition door 13. The inside-outside air switch door 12 opens one of the inside air introduction port 10a and the outside air introduction port 10b and opens the other. With rotation of the partition door 13, the partition door 13 separates the inside-outside air switch box 11 into a space 11a on the inside air introduction port 10a side and a space 11b on the outside air introduction port 10b side.

A filter 14 and a partition wall 15 are provided in the inside-outside air switch box 11. The filter 14 filters the inside air introduced through the inside air introduction port 10a and the outside air introduced through the outside air introduction port 10b. The partition wall 15 separates the inside-outside air switch box 11 into the space 11a on the inside air introduction port 10a side the space 11b on the outside air introduction port 10b side in cooperation with the partition door 13.

Furthermore, the blower unit 3 is provided with a blower casing 20. A centrifugal blower 21 is disposed in the blower casing 20. An introduction flow channel 26 for guiding the air flow that has passed through the filter 14 to an air intake port 25b of a scroll casing 23a is provided outside the centrifugal blower 21 in the blower casing 20.

The centrifugal blower 21 includes a centrifugal fan 22a, a centrifugal fan 22b, a scroll casing 23a, a scroll casing 23b, and an electric motor 24.

The centrifugal fan 22a and the centrifugal fan 22b are respectively supported by a rotation shaft 24a of the electric motor 24. The centrifugal fan 22a is disposed on an upper side of the centrifugal fan 22b in the top-bottom direction.

The scroll casing 23a is provided with an air intake port 25a and accommodates the centrifugal fan 22a. The air intake port 25a is provided on one side of the centrifugal fan 22a in an axis line direction of the centrifugal fan 22a (that is, on an upper side in the top-bottom direction). The air intake port 25a opens to the space 11b side of the outside air introduction port 10b side in the inside-outside air switch box 11. The scroll casing 23a has a blowing port 27a for collecting and blowing out the air flow blown from the centrifugal fan 22a.

The scroll casing 23b is provided with an air intake port 25b and accommodates the centrifugal fan 22b. The air intake port 25b is provided on the other side of the centrifugal fan 22b in the axis line direction (that is, on a lower side in the top-bottom direction). The air intake port 25b opens into the introduction flow channel 26. The scroll casing 23b includes a blowing port 27b for collecting and blowing out the air flow blown from the centrifugal fan 22b.

In this example, the centrifugal fan 22b includes multiple blades 28 arranged in a circumferential direction around the axis line and a main plate 29. The main plate 29 is a support portion that is disposed on the upper side of the multiple blades 28 in the top-bottom direction and supports the multiple blades 28. Further, the main plate 29 is supported by the rotation shaft 24a of the electric motor 24.

The main plate 29 and the multiple blades 28 of the centrifugal fan 22b according to the present embodiment are made of a conductive metal material (that is, a conductor) such as iron. In the scroll casing 23b, a coil 30 is disposed on an upper side of the main plate 29 of the centrifugal fan 22b in the top-bottom direction.

The coil 30 is separated from the main plate 29 of the centrifugal fan 22b. The coil 30 is formed in a ring shape around the rotation shaft 24a.

A gap of, for example, about 3 mm is provided between the main plate 29 of the centrifugal fan 22b and the coil 30 according to the present embodiment.

The main plate 29 generates a heat by induction heating based on an alternating magnetic field from the coil 30. The alternating magnetic field is a magnetic field whose magnetic field intensity changes with time.

In the present embodiment, the coil 30, the main plate 29 of the centrifugal fan 22b, a power circuit 130, and a resonant circuit (that is, an alternating-current output circuit) 131 configure an electric heater 150 for heating the air flow.

The air conditioning unit 2 integrates both of an evaporator (that is, a cooling heat exchanger) 42 and a heater core (that is, a heating heat exchanger) 45 into an air conditioning casing 40. The air conditioning casing 40 configures a casing for circulating the air flow introduced from the inside air introduction port 10a toward the vehicle interior in cooperation with the inside-outside air switch box 11.

The air conditioning unit 2 includes partition walls 49a and 49b for separating an inside of the air conditioning casing 40 into an upper air flow channel 47a and a lower air flow channel 47b. A defroster opening 50a and a face opening 50b are provided on an upper side of the partition walls 49a and 49b in the air conditioning casing 40 in the top-bottom direction.

The defroster opening 50a blows an air conditioning wind onto an inner surface of a front windshield through a duct and a defroster blowing port. The face opening 50b blows out the air conditioning wind to an upper body of an occupant through the duct and a face blowing port.

A foot opening 50c is provided on a lower side of the partition wall 49a and 49b of the air conditioning casing 40 in the top-bottom direction. The foot opening 50c blows out the air conditioning wind to a lower body of the occupant through the duct and a foot blowing port.

The evaporator 42 is disposed so as to extend across the upper air flow channel 47a and the lower air flow channel 47b in the air conditioning casing 40. The evaporator 42 absorbs a latent heat of evaporation of a refrigerant in a refrigeration cycle from an air and cools the air.

The evaporator 42 is one of components of a refrigeration cycle device 60. A low-temperature and low-pressure refrigerant in the evaporator 42 absorbs heat from the blown air and evaporates, to thereby cool the blown air. The refrigeration cycle device 60 is well known and is configured so that the refrigerant circulates from a discharge side of a compressor 61 to an evaporator 42 through a condenser 62, a liquid receiver 63, and an expansion valve 64. A vehicle exterior air (that is, outside air) is blown to the condenser 62 by an electric cooling fan 62a. The cooling fan 62a is driven by a motor 62b.

In the refrigeration cycle device 60, the compressor 61 is driven by a for-traveling engine 70 through an electromagnetic clutch 61a. Therefore, the operation of the compressor 61 can be intermittently controlled by intermittently energizing the electromagnetic clutch 61a.

The heater core 45 is disposed in the air flow downstream side of the evaporator 42 so as to extend across the upper air flow channel 47a and the lower air flow channel 47b in the air conditioning casing 40. The heater core 45 has a flat shape which is thin in a front-rear direction of a vehicle and whose longitudinal direction faces a right-left direction of the vehicle. The heater core 45 reheats a cold air that has passed through the evaporator 42. The heater core 45 heats the air flow with the engine coolant water (that is, hot water) that cools the for-traveling engine as a heat source. Further, as shown in FIG. 1, the heater core 45 is disposed on the air flow downstream side of the coil 30, the main plate 29, and the blades 28.

A bypass flow channel 52a is provided on an upper side of the heater core 45 in the upper air flow channel 47a of the air conditioning unit 2. The bypass flow channel 52a is a flow channel that bypasses the heater core 45 and allows the cold air to flow from the evaporator 42 into the defroster opening 50a and the face opening 50b.

An air mix door 54a is provided in an air flow upstream of the bypass flow channel 52a and the heater core 45 in the upper air flow channel 47a. As the air mix door 54a according to the present embodiment, a slide door slidably moved by a servomotor 122 is used. The air mix door 54a changes a ratio between an opening area of the bypass flow channel 52a and an opening area of an air inlet 500 of the heater core 45 by sliding movement in the upper air flow channel 47a.

A bypass flow channel 52b is provided on a lower side of the heater core 45 in the lower air flow channel 47b of the air conditioning unit 2. The bypass flow channel 52b is a flow channel that bypasses the heater core 45 and allows the cold air to flow from the evaporator 42 to the foot opening 50c side.

As the air mix door 54b according to the present embodiment, a slide door slidably moved by a servomotor 123 is used. The air mix door 54b changes a ratio between an opening area of the bypass flow channel 52b and an opening area of an air inlet 500 of the heater core 45 by sliding movement in the lower air flow channel 47b.

The air conditioning unit 2 includes mode doors 56a, 56b, and 56c. The mode door 56a is rotatably supported to the air conditioning casing 40 to open one of the defroster opening 50a and the face opening 50b and close the other door.

The mode door 56b is rotatably supported to the air conditioning casing 40, and opens and closes the foot opening 50c. The mode door 56c opens and closes a communication opening 58 of the partition wall 49b.

Figure 2:
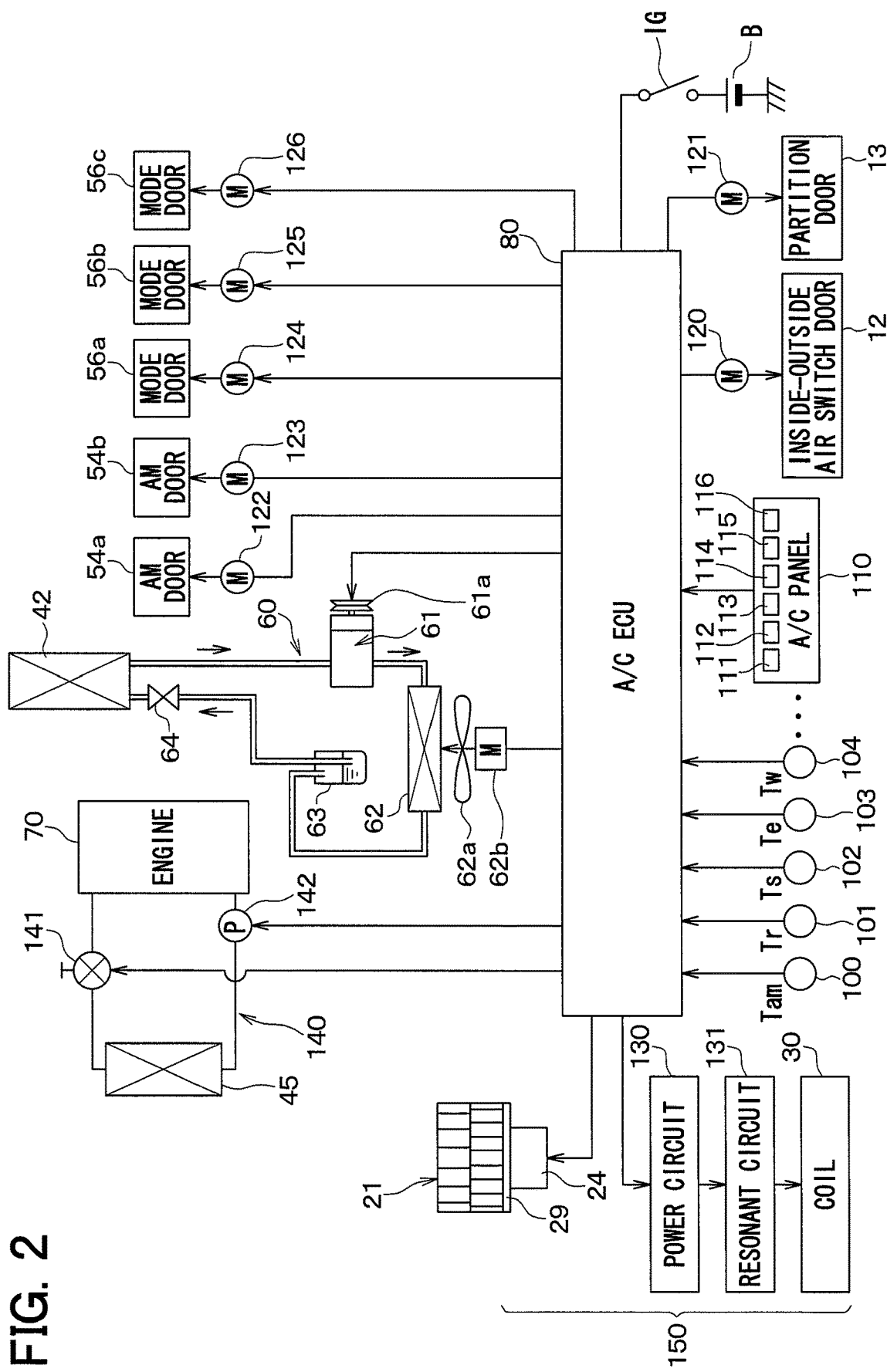
FIG. 2 is a diagram showing an electrical configuration of the vehicle air conditioner according to the first embodiment.

Next, an electric configuration of the vehicle air conditioner 1 according to the present embodiment will be described with reference to FIG. 2.

An air conditioner ECU 80 is an electronic control device including a well-known microcomputer including a CPU, a ROM, a RAM and the like and peripheral circuits of the microcomputer. The air conditioner ECU 80 stores a computer program for air conditioning control in the ROM, and performs various calculations and processes based on a computer program. Both of the ROM and the RAM are non-transitional physical storage media.

Detection signals from well-known air conditioning sensor groups 100 to 104 and various operation signals from an air conditioning operation panel 110 are input to the air conditioner ECU 80.

Specifically, the air conditioning sensor group includes an outside air sensor 100, an inside air sensor 101, an insolation sensor 102, an evaporator temperature sensor 103, a water temperature sensor 104, and the like. The outside air sensor 100 detects an outside air temperature (that is, a vehicle exterior temperature) Tam. The inside air sensor 101 detects an inside air temperature (that is, a vehicle interior temperature) Tr. The insolation sensor 102 detects the amount of insolation Ts entering the vehicle interior. The evaporator temperature sensor 103 is disposed in an air blowing portion of the evaporator 42 and detects an evaporator blowing air temperature Te. The water temperature sensor 104 is disposed in the for-traveling engine and detects a temperature Tw of the engine coolant water which cools the for-traveling engine.

An ignition switch IG is connected to the air conditioner ECU 80. The ignition switch IG is a power switch for starting and stopping the supply of an electric power from the battery B to the for-traveling engine 70.

The air conditioning operation panel 110 is provided with a temperature setting switch 111, a blowing mode switch 112, an inside-outside air switching switch 113, an air-conditioning switch 114, a blower operation switch 115, an automatic switch 116, and the like as various air conditioning operation members. The temperature setting switch 111 is a temperature setting unit that sets a vehicle interior temperature Tset. The blowing mode switch 112 manually sets a blowing mode to be switched by the mode doors 56a and 56b. The inside-outside air switching switch 113 manually sets an inside-outside air suction mode by the inside-outside air switch door 35. The air-conditioning switch 114 issues an operation command signal of the compressor 61 (that is, an ON signal of the electromagnetic clutch 40a). The blower operation switch 115 manually sets an air volume of the blower 37. The automatic switch 116 issues a command signal for executing an automatic mode.

An output side of the air conditioner ECU 80 is connected with the electromagnetic clutch 61a of the compressor 61, servomotors 120, 121, 122, 123, 124, 125, and 126, the electric motor 24 of the centrifugal blower 21, the motor 62b of the cooling fan 62a for cooling the condenser, the power circuit 130, an open-close valve 141, a circulation pump 142, and the like. The operation of those devices is controlled according to an output signal of the air conditioner ECU 80.

The servomotor 120 rotationally drives the inside-outside air switch door 12. The servomotor 121 rotationally drives the partition door 13. The servomotor 122 rotationally drives the air mix door 54a. The servomotor 123 rotationally drives the air mix door 54b. The servomotor 124 rotationally drives the mode door 56a. The servomotor 125 rotationally drives the mode door 56b. The servomotor 126 rotationally drives the mode door 56c.

The power circuit 130 supplies an electric power to the resonant circuit 131. The resonant circuit 131 outputs alternating current having a high frequency (for example, a frequency of 25 kHz) to an induction heating coil 30. The coil 30 supplies an alternating magnetic field to the main plate 29 based on the output current (that is, alternating current) of the resonant circuit 131.

The open-close valve 141 configures a coolant water circulation circuit 140 that circulates the engine coolant water in cooperation with the circulation pump 142, the heater core 45, and the for-traveling engine 70. The open-close valve 141 is an electromagnetic valve that opens and closes between the heater core 45 and the for-traveling engine 70. The circulation pump 142 is a pump that circulates the engine coolant water between the heater core 45 and the for-traveling engine 70.

Next, the operation of the vehicle air conditioner 1 according to the present embodiment will be described.

The air conditioner ECU 80 executes an automatic quick heat control prior to an air conditioning control process.

The air conditioning control process is a process of controlling the air mix doors 54a and 54b through the servomotors 122 and 123 so that the air temperature blown out from the blowing openings 50a to 50c is brought closer to a target blowing temperature TAO. The target blowing temperature TAO is an air temperature required to be blown from the blowing openings 50a to 50c in order to maintain an inside air temperature Tr at a vehicle interior temperature Tset regardless of an outside air temperature Tam and an amount of insolation Ts.

Figure 3:
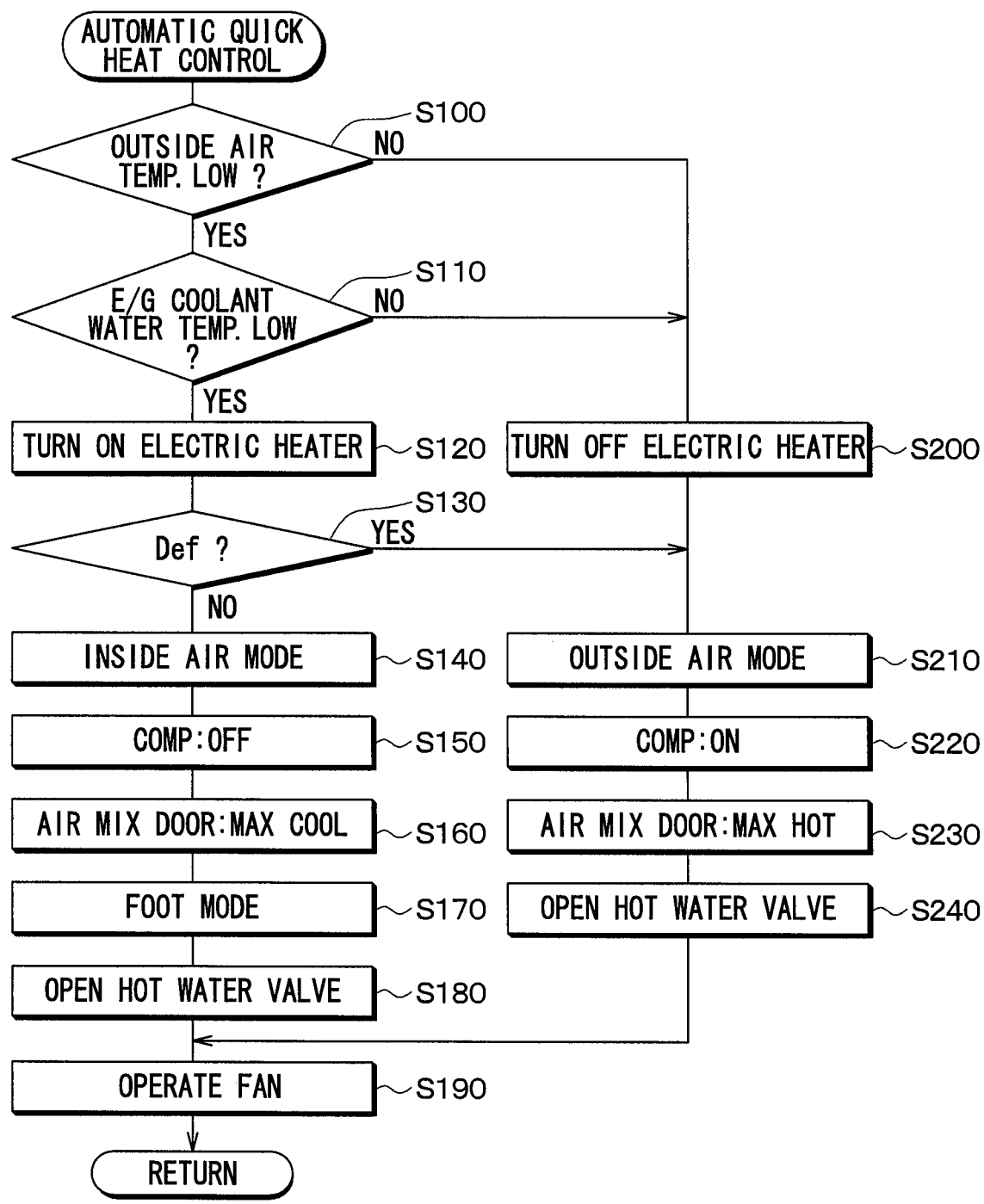
FIG. 3 is a flowchart showing a control process of an air conditioner ECU of FIG. 1.

The execution of the automatic quick heat control is started when an ignition switch IG is turned on. The automatic quick heat control is repetitively executed until the inside air temperature Tr reaches the vehicle interior temperature Tset. Hereinafter, the automatic quick heat control will be described in detail with reference to FIG. 3. FIG. 3 is a flowchart showing the automatic quick heat control of the air conditioner ECU 80.

The air conditioner ECU 80 executes the automatic quick heat control according to the flowchart of FIG. 3.

First, in Step S100, the air conditioner ECU 80 detects the outside air temperature Tam by the outside air sensor 100 and determines whether the detected outside air temperature Tam is equal to or lower than a first threshold, or not.

When the outside air temperature Tam is equal to or lower than the first threshold, it is determined as YES on the assumption that the outside air temperature Tam is low in the above Step S100.

Next, in Step S110, the temperature Tw of the engine coolant water is detected by the water temperature sensor 104 as a determiner, and it is determined whether the detected temperature Tw is equal to or lower than a second threshold, or not.

When the temperature Tw of the engine coolant water is equal to or lower than the second threshold, it is determined as YES on the assumption that the temperature Tw of the engine coolant water is low in the above Step S110.

Next, in Step S120, the electric heater is turned on. More specifically, the power circuit 130 is controlled to supply an electric power from the power circuit 130 to the resonant circuit 131. The resonant circuit 131 resonates based on the electric power from the power circuit 130 and outputs a high frequency alternating current to the induction heating coil 30. The coil 30 supplies an alternating magnetic field to the main plate 29 over time based on the alternating current.

For that reason, an eddy current flows in the main plate 29 so as to cancel the alternating magnetic field. A Joule heat is generated based on an eddy current I and an electric resistance R of the main plate 29. The amount of Joule heat is proportional to I×I×R. In other words, the main plate 29 generates heat by induction heating. For that reason, the Joule heat from the main plate 29 is transmitted to the multiple blades 28. As a result, the temperature of the multiple blades 28 rises. As a result, the electric heater starts to operate.

Next, in Step S130, the air conditioner ECU 80 determines whether a defroster mode is set as the blowing mode, or not.

In this case, the defroster mode is a blowing mode in which the defroster opening 50a is opened by the mode door 56a, the face opening 50b is closed, and the foot opening 50c is slightly opened by the mode door 56b.

A face mode is a blowing mode in which the defroster opening 50a is closed by the mode door 56a, the face opening 50b is opened, and the foot opening 50c is closed by the mode door 56b.

A foot mode is a blowing mode in which the defroster opening 50a is opened by the mode door 56a, the face opening 50b is closed, and the foot opening 50c is fully opened by the mode door 56b.

If the face mode or the foot mode has been set by the blowing mode switch 112 in the above Step S130, a determination of NO is made.

In that case, the air conditioner ECU 80 functions as a switching door controller in Step S140 and sets an inside air mode. The inside air mode is a mode in which the inside air from the inside air introduction port 10a is supplied to the air intake port 25a of the scroll casing 23a and the air intake port 25b of the scroll casing 23b.

Specifically, the air conditioner ECU 80 controls the inside-outside air switch door 12 through the servomotor 120 to open the inside air introduction port 10a and close the outside air introduction port 10b. In addition to the above control, the air conditioner ECU 80 controls the partition door 13 through the servomotor 121, and as indicated by dotted lines in FIG. 1, communicates an interior of the inside-outside air switch box 11 with the space 11a on the inside air introduction port 10a side and the space 11b on the outside air introduction port 10b side.

Next, in Step S150, the air conditioner ECU 80 stops the operation of the compressor 61 as a cooling terminator. For that reason, no refrigerant is supplied to the evaporator 42.

Next, in Step S160, the air conditioner ECU 80 sets the air mix doors 54a and 54b to a max cool mode as an air mix door controller.

More specifically, the air conditioner ECU 80 controls the air mix door 54a through the servomotor 122 to fully open the air inlet of the bypass flow channel 52a and fully close the air inlet 500 of the heater core 45 by the air mix door 54a.

In addition to the above control, the air conditioner ECU 80 controls the air mix door 54b through the servomotor 123 to fully open the air inlet of the bypass flow channel 52b and fully close the air inlet 500 of the heater core 45 by the air mix door 54b.

Next, in Step S170, the air conditioner ECU 80 sets a foot mode as the blowing mode. Specifically, the air conditioner ECU 80 controls the mode door 56a through the servomotor 124 to open the defroster opening 50a and close the face opening 50b by the mode door 56a. In addition to the above control, the air conditioner ECU 80 controls the mode door 56b through the servomotor 125 to fully open the foot opening 50c by the mode door 56b.

Next, in Step S180, the air conditioner ECU 80 controls the open-close valve 141 as a valve controller to close a space between the heater core 45 and the for-traveling engine 70. For that reason, the circulation of the engine coolant water is stopped between the heater core 45 and the for-traveling engine 70.

Next, in Step S190, the air conditioner ECU 80 rotationally drives the rotation shaft 24a of the electric motor 24 of the centrifugal blower 21. In conjunction with the rotation of the rotation shaft 24a, the centrifugal fan 22a and the centrifugal fan 22b are rotationally driven by the rotation shaft 24a.

At this time, the centrifugal fan 22a draws the inside air introduced from the inside air introduction port 10a through the air intake port 25a of the scroll casing 23a and blows out the drawn inside air toward the radially outer side around the rotation shaft 24a.

The scroll casing 23a collects the air flow blown out from the centrifugal fan 22a and blows out the collected air flow from the blowing port 27a toward the upper air flow channel 47a of the air conditioning casing 40.

In the upper air flow channel 47a, the air flow from the blowing port 27a passes through the evaporator 42 and the bypass flow channel 52a and is blown out from the face opening 50b into the vehicle interior.

On the other hand, the centrifugal fan 22b draws the inside air introduced from the inside air introduction port 10a through the air intake port 25b of the scroll casing 23b and blows out the drawn inside air toward the radially outer side around the rotation shaft 24a.

In this situation, as described above, the main plate 29 generates a heat by induction heating, and Joule heat from the main plate 29 is transmitted to the multiple blades 28. For that reason, when the centrifugal fan 22b draws and blows the inside air from the air intake port 25b of the scroll casing 23b, the multiple blades 28 and the main plate 29 heat the inside air. As a result, the centrifugal fan 22b blows a hot air. In this way, the multiple blades 28 and the main plate 29 heat the air flow introduced into the blower casing 20 from the inside air introduction port 10a on the air flow upstream side of the heater core 45.

Therefore, the scroll casing 23b collects the hot air blown from the centrifugal fan 22b and blows the collected hot air out from the blowing port 27b to the lower air flow channel 47b of the air conditioning casing 40.

For that reason, in the lower air flow channel 47b, the hot air from the blowing port 27b passes through the evaporator 42 and the bypass flow channel 52b and is blown into the vehicle interior from the foot opening 50c. Therefore, in the air flows introduced into the blower casing 20 from the inside air introduction port 10a, a flow rate of the air flow passing through the bypass flow channel 52b and flowing into the vehicle interior is larger than a flow rate of the air flow passing through the heater core 45 and flowing into the vehicle interior. Further, with the processing of Steps S140 to S190, the air flow heated by the electric heater 150 passes through the bypass flow channel 52b and flows toward the vehicle interior.

Thereafter, the air conditioner ECU 80 returns to Step S100. For that reason, when the outside air temperature Tam is equal to or lower than the first threshold, the temperature Tw of the engine coolant water is equal to or lower than the second threshold, and the face mode or the foot mode is set, multiple processes are repeated. Those multiple processes include the determination of YES in Steps S100 and S110, the processing of Step S120, the determination of No in Step S130, and the processing of Steps S140, S150, S160, S170, S180 and S190.

As a result, the centrifugal fan 22b draws the inside air from the inside air introduction port 10a through the bypass flow channel 52b, heats the drawn inside air and blows the heated air into the vehicle interior from the foot opening 50c as the hot air. Then, the centrifugal fan 22b draws the blown air flow from the inside air introduction port 10a through the bypass flow channel 52b. The blowing and drawing of the air by the centrifugal fan 22b is repeated. For that reason, the temperature of the hot air blown into the vehicle interior from the foot opening 50c can be raised in a short period of time.

Thereafter, when the temperature Tw of the engine coolant water becomes higher than the second threshold in the above Step S110, the determination by the air conditioner ECU 80 is NO. In conjunction with the above determination, in Step S200, the air conditioner ECU 80 controls the power circuit 130 to stop the supply of the electric power to the resonant circuit 131 from the power circuit 130. For that reason, the resonant circuit 131 stops outputting the high frequency alternating current to the induction heating coil 30 by resonance. For that reason, the main plate 29 is stopped from generating a heat by induction heating.

Next, in Step S210, the air conditioner ECU 80 sets an outside air mode. The outside air mode is a mode in which the outside air from the outside air introduction port 10b is supplied to the air intake port 25a of the scroll casing 23a and the air intake port 25b of the scroll casing 23b.

Specifically, the air conditioner ECU 80 controls the inside-outside air switch door 12 through the servomotor 120 to close the inside air introduction port 10a and open the outside air introduction port 10b. In addition to the above control, the air conditioner ECU 80 controls the partition door 13 through the servomotor 121, and as indicated by dotted lines in FIG. 1, communicates an interior of the inside-outside air switch box 11 with the space 11a on the inside air introduction port 10a side and the space 11b on the outside air introduction port 10b side.

Next, in Step S220, the air conditioner ECU 80 operates the compressor 61. For that reason, the compressor 61 draws a low-pressure refrigerant from the refrigerant outlet of the evaporator 42 and compresses the drawn refrigerant to discharge the high-pressure refrigerant. The condenser 62 performs a heat exchange between the outside air from the cooling fan 62a and the high-pressure refrigerant from the compressor 61 to cool the high-pressure refrigerant.

The expansion valve 64 decompresses the high-pressure refrigerant that has been cooled by the condenser 62. The liquid receiver 63 separates the refrigerant decompressed by the expansion valve 64 into a liquid-phase refrigerant and a gas-phase refrigerant, and supplies the liquid-phase refrigerant to the evaporator 42.

Next, in Step S230, the air conditioner ECU 80 sets the air mix doors 54a and 54b to a max hot mode.

More specifically, the air conditioner ECU 80 controls the air mix door 54a through the servomotor 122 to fully close the air inlet of the bypass flow channel 52a and fully open the air inlet 500 of the heater core 45 by the air mix door 54a.

In addition to the above control, the air conditioner ECU 80 controls the air mix door 54b through the servomotor 123 to fully close the air inlet of the bypass flow channel 52b and fully open the air inlet 500 of the heater core 45 by the air mix door 54b.

Next, in Step S230, the air conditioner ECU 80 controls the open-close valve 141 to open the space between the heater core 45 and the for-traveling engine 70 and actuates the circulation pump 142. For that reason, the engine coolant water is circulated between the heater core 45 and the for-traveling engine 70.

Next, in Step S240, the air conditioner ECU 80 rotationally drives the rotation shaft 24a of the electric motor 24 of the centrifugal blower 21. In conjunction with the rotation of the rotation shaft 24a, the centrifugal fan 22a and the centrifugal fan 22b are rotationally driven by the rotation shaft 24a.

At this time, the centrifugal fan 22a draws the outside air introduced from the outside air introduction port 10b through the air intake port 25a of the scroll casing 23a, and blows out the drawn air to the radially outer side around the rotation shaft 24a.

The scroll casing 23a collects the air flow blown out from the centrifugal fan 22a and blows out the collected air flow from the blowing port 27a toward the upper air flow channel 47a of the air conditioning casing 40.

In this example, in the upper air flow channel 47a, the evaporator 42 performs a heat exchange between the air flow from the blowing port 27a and the liquid-phase refrigerant from the liquid receiver 63, and cools the air flow from the blowing port 27a. For that reason, the evaporator 42 dehumidifies the air flow from the blowing port 27a.

The dehumidified air flow passes through the heater core 45. In this situation, the air flow and the engine coolant water are subjected to the heat exchange in the heater core 45 to heat the air flow. For that reason, the hot air from the heater core 45 is blown out from the face opening 50b.

On the other hand, the centrifugal fan 22b draws the inside air introduced from the inside air introduction port 10a through the air intake port 25b of the scroll casing 23b and blows out the drawn inside air toward the radially outer side around the rotation shaft 24a.

Therefore, the scroll casing 23b collects the air flow blown out from the centrifugal fan 22b and blows out the collected air flow from the blowing port 27b to the lower air flow channel 47b of the air conditioning casing 40.

For that reason, in the lower air flow channel 47b, the air flow from the blowing port 27b is cooled and dehumidified by the refrigerant when passing through the evaporator 42.

The cooled and dehumidified air flow passes through the heater core 45. In this situation, the air flow and the engine coolant water are subjected to the heat exchange in the heater core 45 to heat the air flow. For that reason, the hot air from the heater core 45 is blown out from the foot opening 50c.

When the outside air temperature Tam becomes higher than the first threshold, the determination by the air conditioner ECU 80 is NO in the above Step S100. For that reason, the determination of NO in Step S100, and the processing of Steps S200, 210, 220, 230, and 240 are repeated.

Furthermore, when the defroster mode is set as the blowing mode, the air conditioner ECU 80 performs an ON process of the electric heater 150 in Step S120 after the determination of NO in Steps S100 and S110, and then performs the determination of YES in the above Step S130.

For that reason, the air conditioner ECU 80 repeats the determination of NO in Steps S100 and S110 and the processing of Steps S120, S210, S220, S230, and S240.

In that case, the centrifugal fan 22a draws the outside air introduced from the outside air introduction port 10b through the air intake port 25a of the scroll casing 23a and blows out the drawn air to the radially outer side around the rotation shaft 24a.

The scroll casing 23a collects the air flow blown out from the centrifugal fan 22a and blows out the collected air flow from the blowing port 27a toward the upper air flow channel 47a of the air conditioning casing 40.

In this case, in the upper air flow channel 47a, the evaporator 42 cools and dehumidifies the air flow from the blowing port 27a by the refrigerant. The cooled and dehumidified air flow passes through the heater core 45. In this situation, the air flow is heated by the engine coolant water in the heater core 45. For that reason, the hot air from the heater core 45 is blown out from the face opening 50b.

In this case, the centrifugal fan 22b draws the outside air introduced from the outside air introduction port 10b through the air intake port 25b of the scroll casing 23b and blows out the drawn outside air to the radially outer side around the rotation shaft 24a.

In this example, when the centrifugal fan 22b draws and blows out the outside air from the air intake port 25b of the scroll casing 23b, the multiple blades 28 and the main plate 29 heat the outside air. As a result, the centrifugal fan 22b blows a hot air. For that reason, the air flow passes from the centrifugal fan 22b through the evaporator 42. In this situation, the air flow is cooled and dehumidified by the refrigerant.

The cooled and dehumidified air flow passes through the heater core 45. In this situation, the air flow and the engine coolant water are subjected to the heat exchange in the heater core 45 to heat the air flow. For that reason, the hot air from the heater core 45 is blown out from the foot opening 50c.

According to the present embodiment described above, the vehicle air conditioner 1 includes the inside-outside air switch box 11 and the centrifugal blower 21 that blows the air flow introduced from the inside air introduction port 10a or the outside air introduction port 10b. The inside-outside air switch box 11 has the inside-outside air switch door 12 that opens one of the inside air introduction port 10a and the outside air introduction port 10b and closes the other.

In the centrifugal fan 22b of the centrifugal blower 21, the coil 30, the power circuit 130, and the resonant circuit 131 configure the electric heater 150 that heats the air flow introduced from the inside air introduction port 10a or the outside air introduction port 10b.

When the air conditioner ECU 80 determines that the temperature Tw of the engine coolant water is equal to or lower than the second threshold, the air conditioner ECU 80 controls the air mix door 54b through the servomotor 123. More specifically, the air conditioner ECU 80 fully opens the air inlet of the bypass flow channel 52b and fully closes the air inlet 500 of the heater core 45 by the air mix door 54b.

As described above, when the temperature Tw of the engine coolant water is low, the air flow introduced from the inside air introduction port 10a is heated by the electric heater 150. The heated air flow does not pass through the heater core 45, passes through the bypass flow channel 52b, and flows toward the vehicle interior. For that reason, even when the temperature Tw of the engine coolant water is low, the hot air can be blown into the vehicle interior. In other words, the quick heating property of the vehicle air conditioner 1 that blows the air flow into the vehicle interior can be improved.

In addition to the above control, as compared to a case where the air flow passes through the heater core 45, a pressure loss can be reduced and power saving and noise reduction can be improved.

According to the present embodiment, when the air conditioner ECU 80 determines that the temperature Tw of the engine coolant water is equal to or lower than the second threshold, the air conditioner ECU 80 controls the open-close valve 141 to close the space between the heater core 45 and the for-traveling engine 70. For that reason, the heater core 45 can be prevented from cooling the air flow in the lower air flow channel 47b by the engine coolant water. Therefore, the time required to raise the temperature of the air flow blown into the vehicle interior can be shortened.

According to the present embodiment, when the air conditioner ECU 80 determines that the temperature Tw of the engine coolant water is equal to or lower than the second threshold, the air conditioner ECU 80 stops the operation of the compressor 61. For that reason, no refrigerant is supplied to the evaporator 42. For that reason, when the air flow heated by the electric heater 150 passes through the evaporator 42, the air flow can be prevented from being cooled by the refrigerant. Therefore, the time required to raise the temperature of the air flow blown into the vehicle interior can be further shortened.

In this situation, when the air flow heated by the electric heater 150 passes through the evaporator 42, the air flow is cooled by the evaporator 42 per se. However, as described above, the refrigerant is not supplied to the evaporator 42. The heat capacity of the evaporator 42 per se is also small. For that reason, the amount of heat to be absorbed by the evaporator 42 from the air flow passing through the evaporator 42 is extremely small.

According to the present embodiment, when the air conditioner ECU 80 determines that the temperature Tw of the engine coolant water is equal to or lower than the second threshold, the air conditioner ECU 80 sets the inside air mode. For that reason, the inside air can be heated by the electric heater 150, and the heated inside air can be blown into the vehicle interior.

Therefore, the inside air heated by the electric heater 150 is blown out into the vehicle interior, the blown air flow is introduced from the inside air introduction port 10a, and the introduced air flow is repetitively heated by the electric heater 150.

Therefore, a time required to raise the temperature of the air flow blown into the vehicle interior can be further shortened, as compared with a case where the outside air introduced from the outside air introduction port 10b is heated by the electric heater 150.

According to the present embodiment, when the air conditioner ECU 80 determines that the temperature Tw of the engine coolant water is equal to or lower than the second threshold, the air conditioner ECU 80 controls the open-close valve 141 to close the space between the heater core 45 and the for-traveling engine 70. For that reason, the circulation of the engine coolant water is stopped between the heater core 45 and the for-traveling engine 70. For that reason, the heat of the air flow passing around the heater core 45 can be prevented from being absorbed by the heater core 45.

Although the air flow passing around the heater core 45 is cooled by the engine coolant water remaining in the heater core 45, as described above, the circulation of the engine coolant water is stopped between the heater core 45 and the for-traveling engine 70. For that reason, a heat capacity of the engine coolant water remaining in the heater core 45 is extremely small. Therefore, the amount of heat absorbed from the air flow by the engine coolant water in the heater core 45 is extremely small.

According to the present embodiment, the main plate 29 (that is, the support portion) of the centrifugal fan 22b is used as a component of the electric heater 150. For that reason, as compared with a case where the electric heater 150 is separated from the centrifugal fan 22b, the size of the electric heater 150 can be reduced. For that reason, the size of the vehicle air conditioner 1 can be reduced.

Second Embodiment

Figure 4:
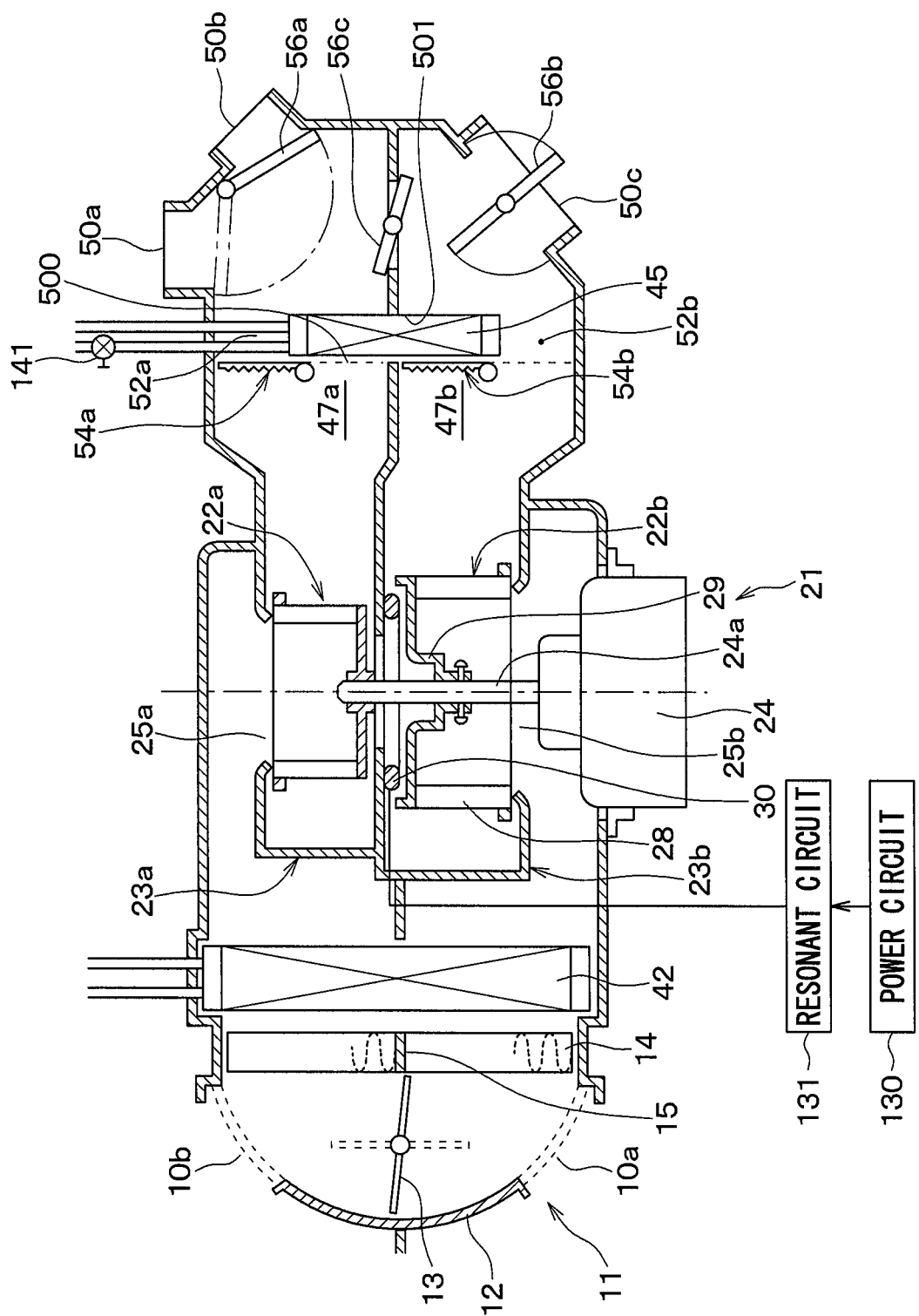
FIG. 4 is a cross-sectional view showing a configuration of a vehicle air conditioner according to a second embodiment.

In the above first embodiment, the example in which the evaporator 42 is disposed on the air flow downstream side of the centrifugal blower 21 has been described. However, instead of the above configuration, as shown in FIG. 4, the evaporator 42 may be disposed on an air flow upstream side of the centrifugal blower 21. In FIG. 4, the same reference numerals as those of FIG. 1 indicate the same configuration elements, and the description thereof will be omitted.

Similarly, in this example, as shown in FIG. 4, a heater core 45 is disposed on an air flow downstream side of a coil 30, a main plate 29, and blades 28. Therefore, the multiple blades 28 and the main plate 29 heat the air flow introduced into a blower casing 20 from an inside air introduction port 10a on the air flow upstream sides of the heater core 45.

In this case, centrifugal fans 22a and 22b of the centrifugal blower 21 blow out the air flow drawn from an inside-outside air switch box 11 through the evaporator 42 to an upper air flow channel 47a and a lower air flow channel 47b. Further, in the inside air mode, the air flow heated by the electric heater 150 passes through the bypass flow channel 52b and flows toward the vehicle interior.

Third Embodiment

In the above first embodiment, the example in which the upper air flow channel 47a and the lower air flow channel 47b are provided in the air conditioning casing 40 with the use of the partition walls 49a and 49b has been described. Instead, a third embodiment in which one air flow channel is provided in the air conditioning casing 40 with the elimination of the partition walls 49a and 49b will be described.

Figure 5:
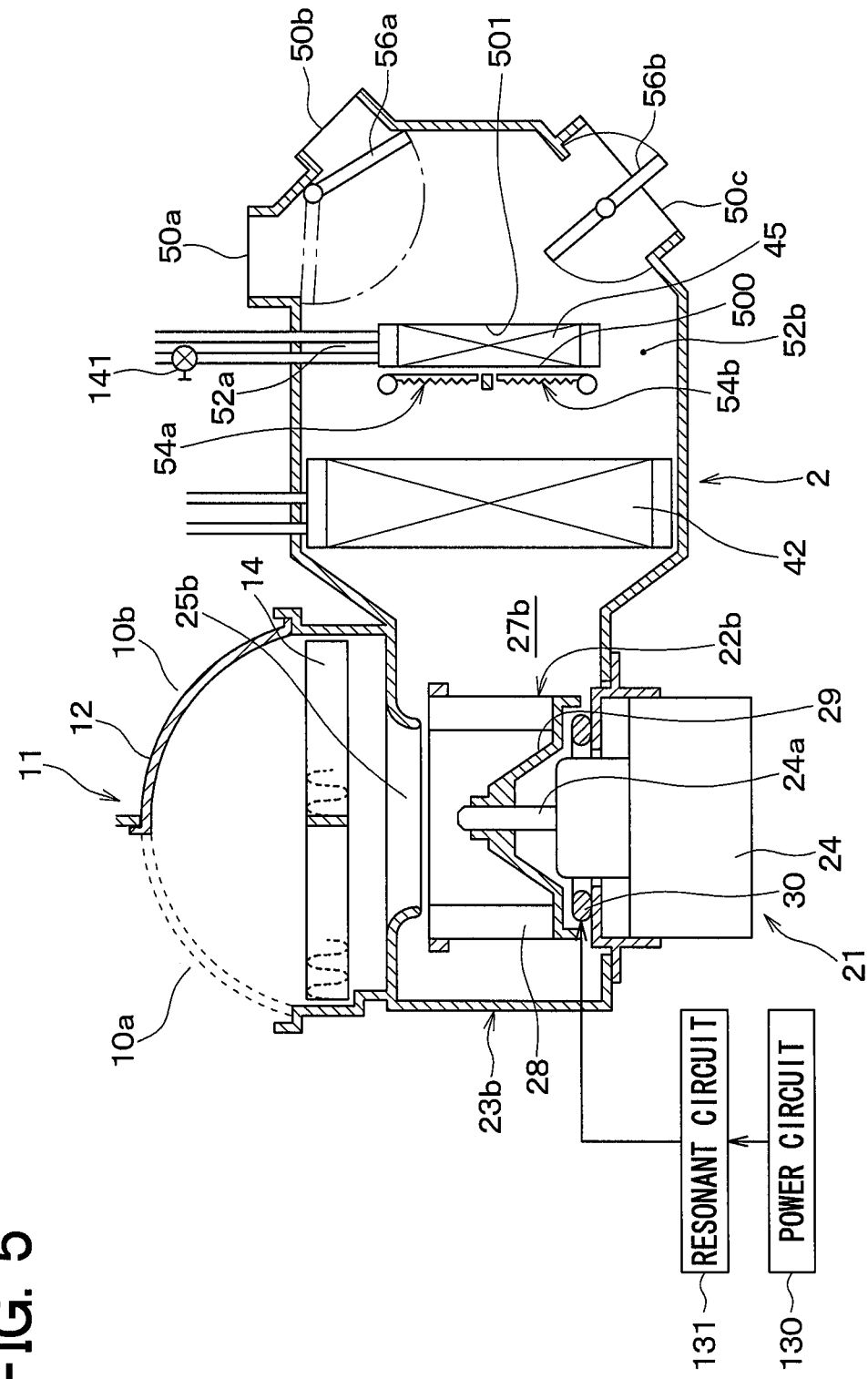
FIG. 5 is a cross-sectional view showing a configuration of a vehicle air conditioner according to a third embodiment.

FIG. 5 is a cross-sectional view of a vehicle air conditioner 1 according to a third embodiment. In FIG. 5, the same reference numerals as those of FIG. 1 indicate the same configuration elements, and the description thereof will be omitted.

In FIG. 5, the partition door 13 and the partition wall 15 are deleted from the blower unit 3 in FIG. 1. In FIG. 5, the centrifugal fan 22a and the scroll casing 23a are deleted from the centrifugal blower 21 in FIG. 1.

For that reason, in the centrifugal blower 21 according to the present embodiment, a centrifugal fan 22b and a scroll casing 23b are provided. An air intake port 25b of the scroll casing 23b is disposed to face upward in an axis line direction.

Fourth Embodiment

Figure 6:
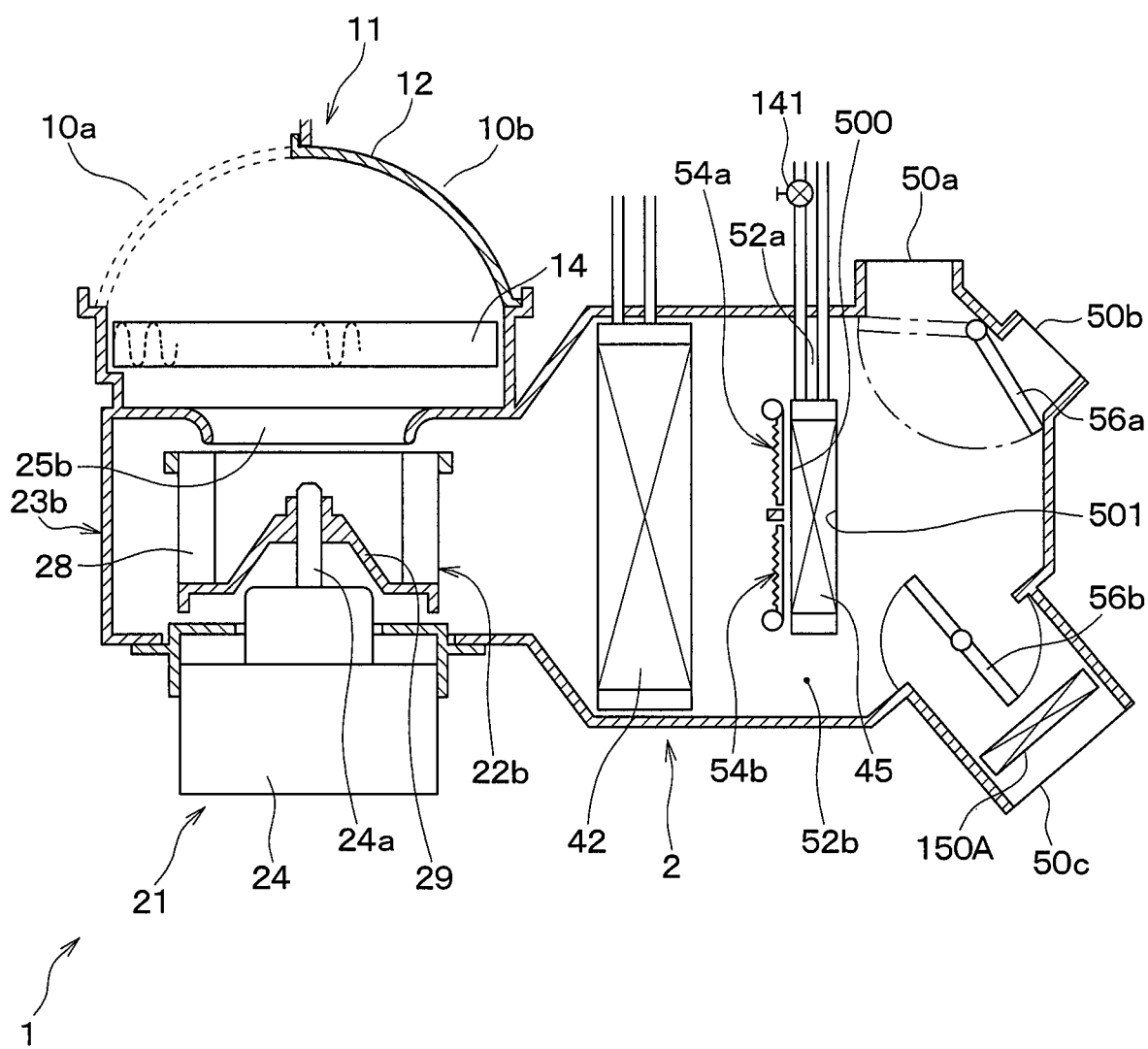
FIG. 6 is a cross-sectional view showing a configuration of a vehicle air conditioner according to a fourth embodiment.

In the first embodiment, the example in which the electric heater 150 is configured by the centrifugal fan 22b has been described. However, alternatively, as shown in FIG. 6, an electric heater 150A such as a PCT heater may be disposed in a foot opening 50c. In FIG. 6, the same reference numerals as those of FIG. 5 indicate the same configuration elements, and the description thereof will be omitted.

In that case, as shown in FIG. 6, a heater core 45 is disposed on an air flow upstream side of the electric heater 150A. Therefore, with the processing of Steps S140 to S190, the electric heater 150A heats the air flow introduced into a blower casing 20 from an inside air introduction port 10a on the air flow downstream side of the heater core 45. Further, with the processing of Steps S140 to S190, the air flow that has passed through a bypass flow channel 52b is heated by the electric heater 150A and flows toward a vehicle interior.

Fifth Embodiment

In the above third embodiment, the example in which the centrifugal blower 21 is disposed on the air flow upstream side of the heater core 45 has been described. Alternatively, a fifth embodiment in which the centrifugal blower 21 is disposed on the air flow downstream side of the heater core 45 will be described.

Figure 7:
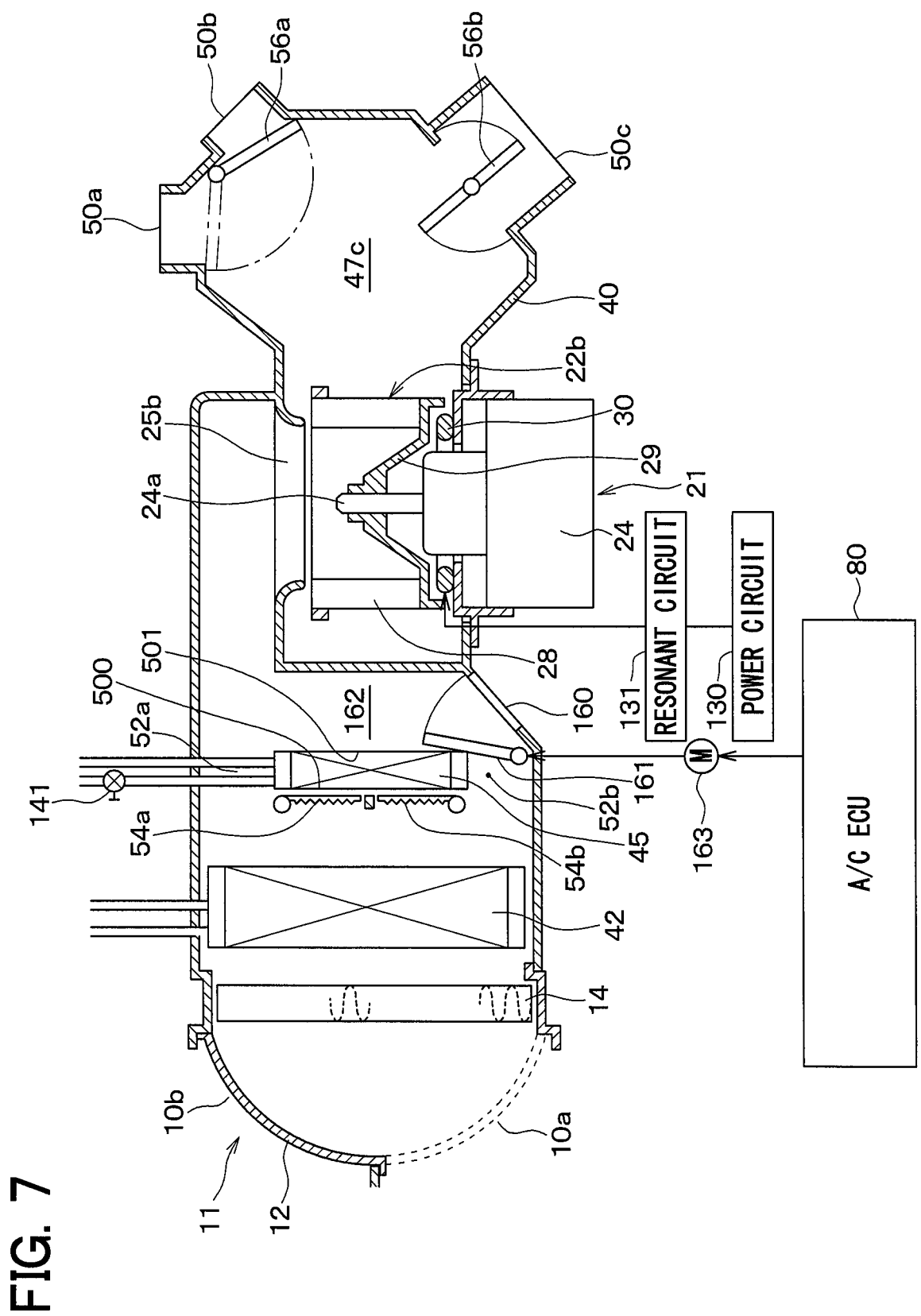
FIG. 7 is a cross-sectional view showing a configuration of a vehicle air conditioner according to a fifth embodiment.

FIG. 7 is a cross-sectional view showing a configuration of a vehicle air conditioner 1 according to the present embodiment. In FIG. 7, the same reference numerals as those of FIG. 5 indicate the same configuration elements, and a description of the same configuration elements will be omitted.

As shown in FIG. 7, the heater core 45 is disposed on the air flow upstream side of a coil 30, a main plate 29, and blades 28.

In an air conditioning casing 40 according to the present embodiment, an inside air introduction port (that is, an air introduction port) 160 is provided on the air flow downstream side (that is, the centrifugal blower 21 side) of a bypass flow channel 52b.

The inside air introduction port 160 communicates an air flow channel 162 on the downstream side of the heater core 45 and the bypass flow channel 52b in the air flow direction in the air conditioning casing 40 with the vehicle interior. The air flow channel 162 is provided between the heater core 45 and a scroll casing 23b. The air flow channel 162 is an air flow channel for guiding the air flow that has passed through the heater core 45 or the bypass flow channel 52b to the air intake port 25b. The inside air introduction port 160 communicates the vehicle interior with the inside of the air conditioning casing 40. The air flow channel 162 is a bypass flow channel that allows the air flow introduced from the inside air introduction port 160 to flow toward the vehicle interior while bypassing the heater core 45.

In the vehicle air conditioner 1 of the present embodiment, an inside air introduction door 161 is provided as an inside air door. The inside air introduction door 161 is rotatably supported to the air conditioning casing 40. The inside air introduction door 161 opens one of an air outlet of the bypass flow channel 52b and the inside air introduction port 160 and closes the other. The inside air introduction door 161 is rotationally driven by a servomotor 163. The servomotor 163 is controlled by an air conditioner ECU 80.

Next, the operation of the present embodiment will be described with reference to FIG. 3.

First, when an outside air temperature Tam is equal to or lower than a first threshold, the air conditioner ECU 80 makes a determination of YES in Step S100. Next, when a temperature Tw of an engine coolant water is equal to or lower than a second threshold, the air conditioner ECU 80 makes a determination of YES in Step S110. Next, in Step S120, the air conditioner ECU 80 turns on an electric heater.

In this situation, if a face mode or a foot mode has been set by a blowing mode switch 112, the air conditioner ECU 80 makes a determination of NO in Step S130. In that case, in Step S140, the air conditioner ECU 80 sets an inside air mode. Specifically, the air conditioner ECU 80 controls the inside air introduction door 161 through the servomotor 163 to close an air outlet of the bypass flow channel 52b and open the inside air introduction port 160.

In addition, the air conditioner ECU 80 controls an inside-outside air switch door 12 through the servomotor 120 to open an inside air introduction port 10a and close an outside air introduction port 10b.

Next, in Step S150, the air conditioner ECU 80 stops the operation of a compressor 61. Next, in Step S160, the air conditioner ECU 80 sets air mix doors 54a and 54b to a max cool mode.

Next, in Step S170, the air conditioner ECU 80 sets a foot mode as the blowing mode. Next, in Step S180, the air conditioner ECU 80 controls an open-close valve 141 to close a space between the heater core 45 and a for-traveling engine 70.

Next, in Step S190, the air conditioner ECU 80 rotationally drives the rotation shaft 24a of the electric motor 24 of the centrifugal blower 21. In conjunction with the rotation of the rotation shaft 24a, the centrifugal fan 22b is rotationally driven by the rotation shaft 24a. As a result, the centrifugal fan 22b draws the inside air introduced through the air flow channel 162 and the inside air introduction port 160 and blows out the drawn air toward the radially outer side around the rotation shaft 24a.

In addition to the above operation, the centrifugal fan 22b draws the inside air introduced through the inside air introduction port 10a through a filter 14, an evaporator 42, the bypass flow channel 52a, and an air intake port 25b of a scroll casing 23b.

In this way, the centrifugal fan 22b draws the inside air and blows out the drawn air. In this situation, multiple blades 28 and a main plate 29 heat the inside air. As a result, the centrifugal fan 22b blows a hot air. In this way, the multiple blades 28 and the main plate 29 heat the air flow introduced into the blower casing 20 from the inside air introduction port 10a on the air flow downstream side of the heater core 45.

Therefore, the scroll casing 23b collects the hot air blown from the centrifugal fan 22b and blows out the collected hot air from the blowing port 27b into the air flow channel 47c of the air conditioning casing 40. The hot air blown out to the air flow channel 47c is blown into the vehicle interior from the foot opening 50c.

In this example, an air flow channel through which the inside air from the inside air introduction port 10a flows to the centrifugal fan 22b through the filter 14, the evaporator 42, and the bypass flow channel 52a is defined as a first air flow channel. An air flow channel through which the inside air from the inside air introduction port 160 flows to the centrifugal fan 22b through the air flow channel 162 is defined as a second air flow channel. Since the first air flow channel causes the air flow to pass through the evaporator 42, a pressure loss of the first air flow channel is larger than that of the second air flow channel. For that reason, the air amount flowing through the second air flow channel is larger than the amount of air flowing through the first air flow channel.

For that reason, the inside air from the inside air introduction port 160 flows to the centrifugal fan 22b through the air flow channel 162, and the flowing air flow is heated by the electric heater 150 and is blown out into the vehicle interior from the foot opening 50c as the hot air. The blown air flow is repetitively again introduced into the inside air introduction port 160 and heated by the electric heater 150. The air flow that has passed through the air flow channel 162 which is the bypass flow channel is heated by the electric heater 150 and flows toward the vehicle interior.

In addition, when the outside air temperature Tam is equal to or higher than the first threshold and the determination of NO is made in Step S100, the air conditioner ECU 80 controls the power circuit 130 to stop the supply of the electric power to the resonant circuit 131 from the power circuit 130 in Step S200. Next, in Step S210, the air conditioner ECU 80 sets an outside air mode. Specifically, the air conditioner ECU 80 controls the inside-outside air switch door 12 through the servomotor 120 to close the inside air introduction port 10a and open the outside air introduction port 10b. In addition to the above control, the air conditioner ECU 80 controls the inside air introduction door 161 through the servomotor 163 to open an air outlet of the bypass flow channel 52b and close the inside air introduction port 160.

Next, in Step S220, the air conditioner ECU 80 operates the compressor 61. Next, in Step S230, the air conditioner ECU 80 sets the air mix doors 54a and 54b to a max hot mode.

Next, in Step S240, the air conditioner ECU 80 controls the open-close valve 141 to open the space between the heater core 45 and the for-traveling engine 70 and actuates the circulation pump 142. For that reason, the engine coolant water is circulated between the heater core 45 and the for-traveling engine 70.

Next, in Step S240, the air conditioner ECU 80 rotationally drives the rotation shaft 24a of the electric motor 24 of the centrifugal blower 21. In conjunction with the rotation of the rotation shaft 24a, the centrifugal fan 22b is rotationally driven by the rotation shaft 24a.

In this situation, the centrifugal fan 22b generates the air flow drawn from the outside air introduction port 10b for blowing the outside air. For that reason, the air flow drawn from the outside air introduction port 10b flows to the heater core 45 through the filter 14 and the evaporator 42. For that reason, the hot air is blown out from the heater core 45.

The blown hot air flows into the air intake port 25b of the scroll casing 23b through the air flow channel 162. The hot air drawn into the air intake port 25b in this way is drawn by the centrifugal fan 22b and blown out to the radially outer side. The hot air blown out in this way is blown out from any of the openings 50a, 50b, and 50c.

According to the present embodiment described above, the inside air introduction port 160 is provided on the air flow downstream side of the bypass flow channel 52b in the air conditioning casing 40. When the air conditioner ECU 80 determines that the temperature Tw of the engine coolant water is equal to or lower than the second threshold, the air conditioner ECU 80 controls the inside air introduction door 161 through the servomotor 163 to fully open the inside air introduction port 160 and fully close the air outlet of the bypass flow channel 52b. As a result, the inside air introduced through the inside air introduction port 160 flows into the air intake port 25b of the scroll casing 23b with the avoidance of the heater core 45. The air flow drawn into the air intake port 25b in this manner is drawn by the centrifugal fan 22b and blown out to the radially outer side.

In this situation, the air flow drawn by the centrifugal fan 22b is heated by the electric heater 150, and the heated air flow is blown out from the foot opening 50c. For that reason, even when the temperature Tw of the engine coolant water is low, the hot air can be blown into the vehicle interior.

OTHER EMBODIMENTS (1) In the fifth embodiment, the example in which the inside air introduction port 160 for communicating between the air flow downstream side of the bypass flow channel 52b in the air conditioning casing 40 and the vehicle interior is disposed has been described. Alternatively, a configuration shown in FIG. 8 can be applied.

Figure 8:
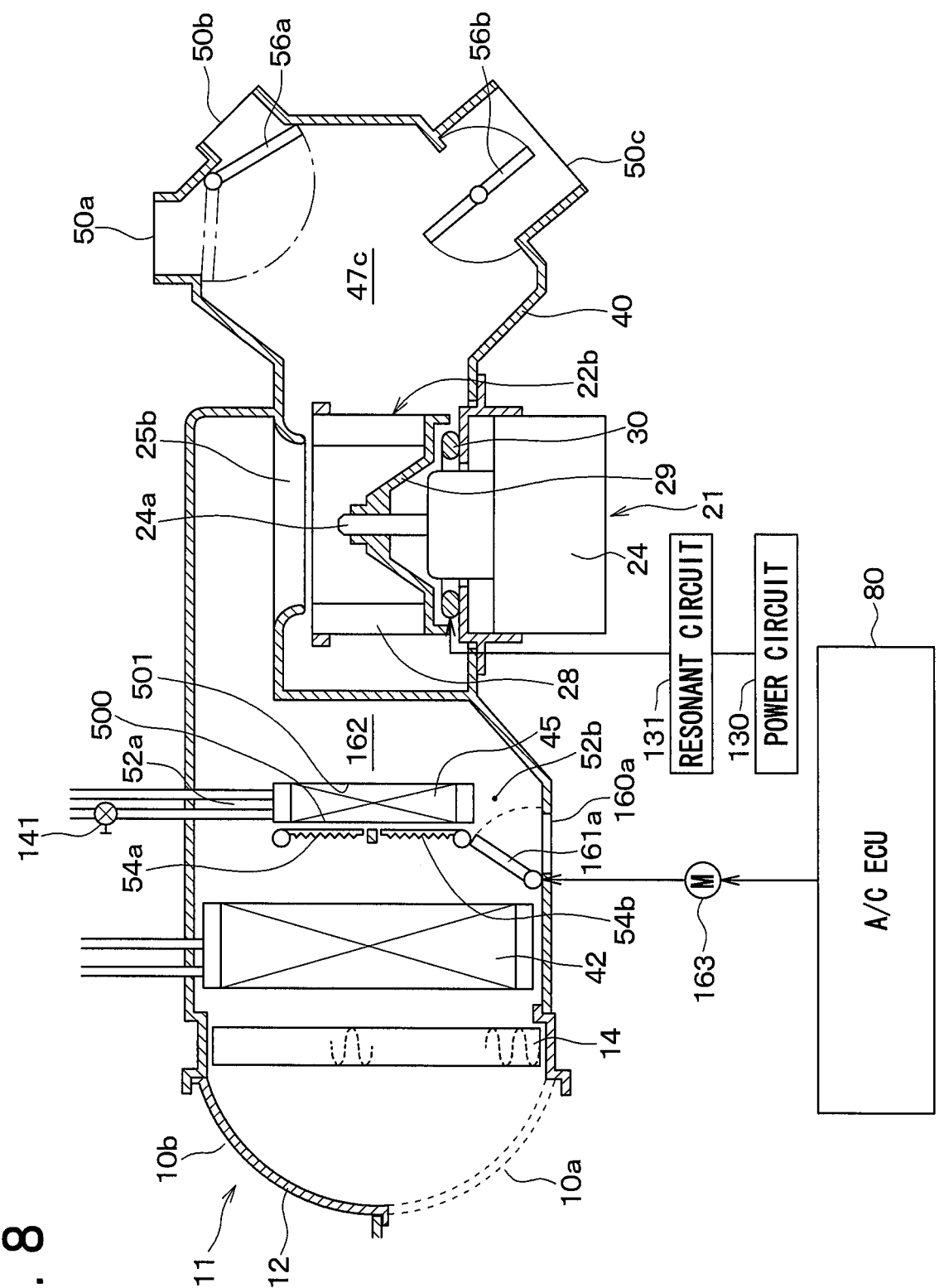
FIG. 8 is a cross-sectional view showing a configuration of a vehicle air conditioner according to a first modification of the fifth embodiment.

In FIG. 8, the inside air introduction port 160 in FIG. 7 is replaced with an inside air introduction port (that is, an air introduction port) 160a for communicating between a bypass flow channel 52b in the air conditioning casing 40 and a vehicle interior. In addition, in FIG. 8, the inside air introduction door 161 in FIG. 7 is replaced with an inside air introduction door 161a as an inside air door for opening and closing the inside air introduction port 160a.

In that case, when the inside air introduction door 161a opens the inside air introduction port 160a, an inside air introduced from the vehicle interior through the inside air introduction port 160a is drawn into a centrifugal fan 22b through a bypass flow channel 52b, an air flow channel 162, and an inside air introduction port 160. For that reason, the same operational effects as those in the fifth embodiment can be obtained.

(2) In the fifth embodiment, the example in which the inside air introduction port 160 for communicating between the air flow downstream side of the bypass flow channel 52b in the air conditioning casing 40 and the vehicle interior is disposed has been described. However, alternatively, a configuration shown in FIG. 9 can be applied.

Figure 9:
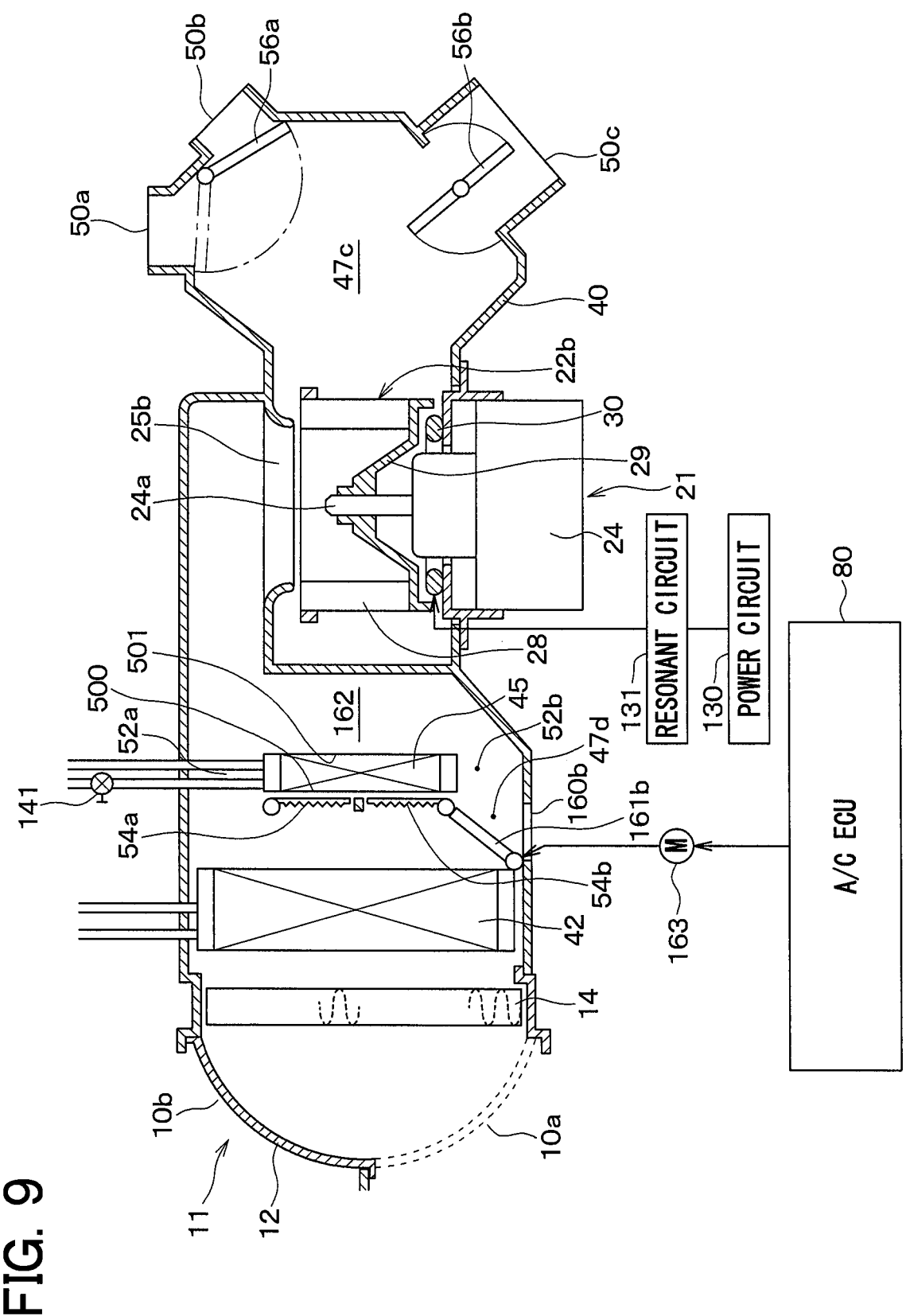
FIG. 9 is a cross-sectional view showing a configuration of a vehicle air conditioner according to a second modification of the fifth embodiment.

In FIG. 9, the inside air introduction port 160 in FIG. 7 is replaced with an inside air introduction port (that is, an air introduction port) 160b for communicating an air flow channel 47d between a space between a bypass flow channel 52b and an evaporator 42 in an air conditioning casing 40 and a vehicle interior. In addition, in FIG. 9, the inside air introduction door 161 in FIG. 7 is replaced with an inside air introduction door 161b as an inside air door for opening and closing the inside air introduction port 160b.

In that case, when the inside air introduction door 161b opens the inside air introduction port 160b, an inside air introduced from the vehicle interior through the inside air introduction port 160b is drawn into a centrifugal fan 22b through an air flow channel 47d, a bypass flow channel 52b, an air flow channel 162, and an air intake port 25b. For that reason, the same operational effects as those in the fifth embodiment can be obtained.

Figure 10:
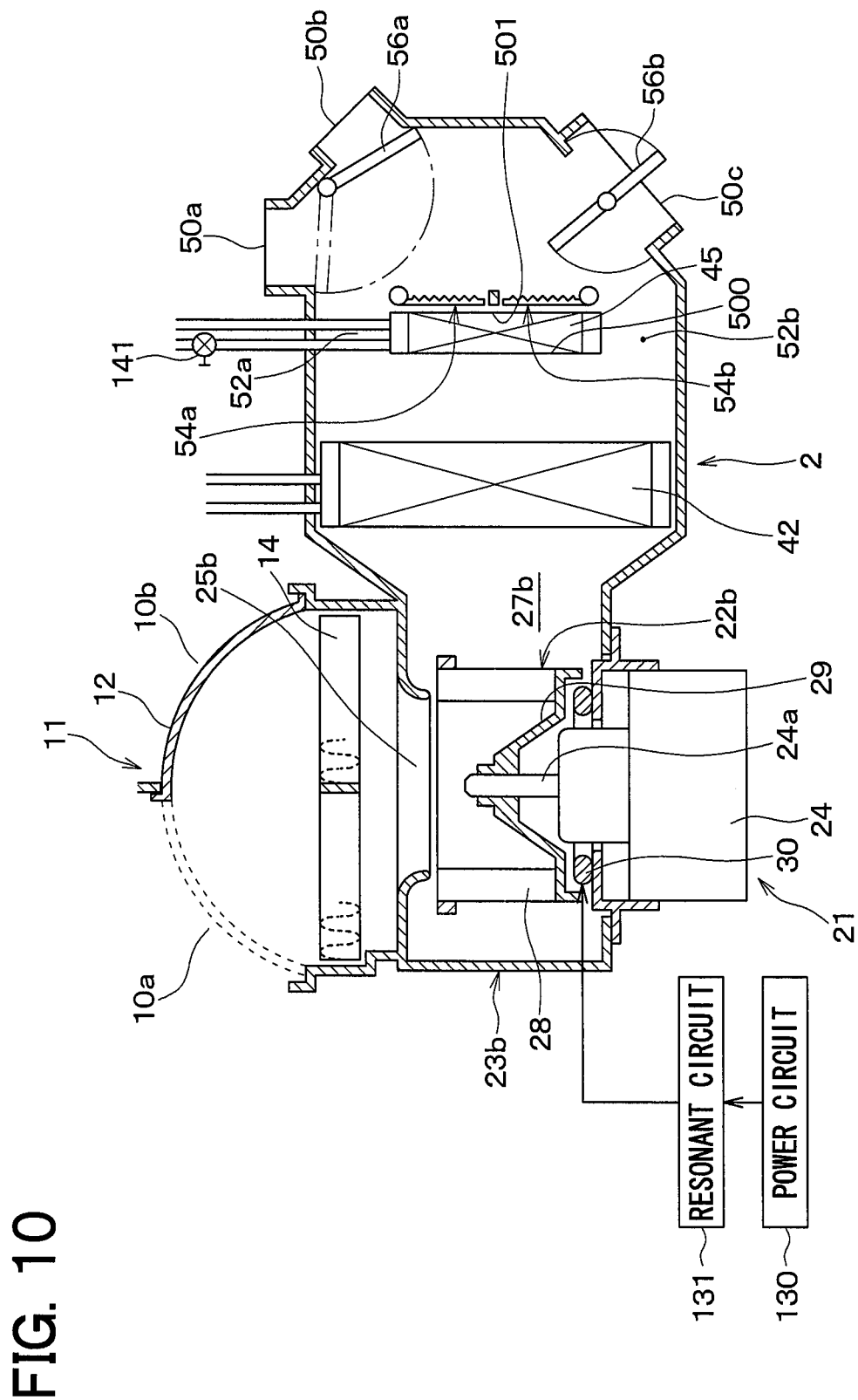
FIG. 10 is a cross-sectional view showing a configuration of a vehicle air conditioner according to another embodiment.

(3) In the third embodiment, the example in which the air mix door 54b that opens one of the air inlet 500 of the heater core 45 and the bypass flow channel 52b and closes the other is used has been described. Alternatively, however, as shown in FIG. 10, the air mix door 54b may be configured to open one of an air outlet 501 of a heater core 45 and the bypass flow channel 52b and close the other.

In that case, there is a need to prevent the air flow that has passed through an evaporator 42 from flowing into the heater core 45 from the air inlet 500, and passing through the heater core 45 in a state where the air mix door 54b closes the air outlet 501 of the heater core 45 and opens the bypass flow channel 52b.

Further, the air mix door 54a may be configured to open one of the air outlet 501 of the heater core 45 and the bypass flow channel 52a and close the other.

Further, in the first, second, fourth, and fifth embodiments, the air mix door 54b may be configured to open one of the air outlet 501 of the heater core 45 and the bypass flow channel 52b and close the other. Further, in the first, second, fourth, and fifth embodiments, the air mix door 54a may be configured to open one of the air outlet 501 of the heater core 45 and the bypass flow channel 52a and close the other.

(4) In the first to fifth embodiments, the example in which the engine coolant water is used as the heat medium used for heating the air flow by the heater core 45 has been described. However, alternatively, a refrigerant of a vapor compression type refrigeration cycle may be used as the heat medium. In other words, in the vapor compression type refrigeration cycle, a radiator for heating the air flow by a high-temperature high-pressure refrigerant may be used as the heater core 45.

(5) In the first to fifth embodiments, the main plate 29 is used as the support portion for performing induction heating. Alternatively, parts of the centrifugal fan 22b other than the main plate 29 may be used as the support portion for performing the induction heating.

More specifically, a ring member that supports the multiple blades 28 may be used as the support portion for performing the induction heating. The ring member is formed in a ring shape around the axis line direction of the rotation shaft 24a.

For example, when the main plate 29 supports one side of the rotation shaft 24a in an axis line direction among the multiple blades 28, the ring member supports the other side of the rotation shaft 24a in the axis line direction among the multiple blades 28.

(6) In the above embodiment, in the case where the air mix door is set to the max cool mode by the processing of Steps S140 to S190, the air flow introduced into the casing from the air introduction port does not pass through the heater core and flows toward the vehicle interior. However, the present disclosure may not be always limited to the above configuration. For example, in the case where the air mix door is set to the max cool mode by the processing of Steps S140 to S190, a slight part of the air flow introduced into the casing from the air introduction port may flow toward the vehicle interior after having passed through the heater core. Even in that case, in the air flows introduced into the casing from the air introduction port, a flow rate of the air flow passing through the bypass flow channel and flowing into the vehicle interior is larger than a flow rate of the air flow passing through the heater core and flowing into the vehicle interior.

(7) In the first, second and third embodiments, the air flow that has been heated by the electric heater passes through the bypass flow channel and flows toward the vehicle interior. Further, in the fourth and fifth embodiments, the air flow that has passed through the bypass flow channel is heated by the electric heater and flows toward the vehicle interior. Therefore, the configuration in which the air flow passing through the bypass flow channel is heated by the electric heater and flows toward the vehicle interior is common to the first to fifth embodiments. Further, the electric heater may heat the air flow while passing through the bypass passage. Also in that case, the configuration in which the air flow passing through the bypass flow channel is heated by the electric heater and flows toward the vehicle interior is common to the first to fifth embodiments.

(8) It should be noted that the present disclosure is not limited to the embodiments described above, and can be appropriately modified. In addition, each of the above-described embodiments is related to each other, and can be appropriately combined with each other except for a case where the combination is apparently impossible. In the above-described respective embodiments, elements configuring the embodiments are not necessarily indispensable as a matter of course, except when the elements are particularly specified as indispensable and the elements are considered as obviously indispensable in principle. In the above-described respective embodiments, when numerical values such as the number, figures, quantity, a range of configuration elements in the embodiments are described, the numerical values are not limited to a specific number, except when the elements are particularly specified as indispensable and the numerical values are obviously limited to the specific number in principle. In the above-described respective embodiments, when a shape, a positional relationship, and the like of a configuration element and the like are mentioned, the shape, the positional relationship, and the like are not limited thereto excluding a particularly stated case and a case of being limited to specific shape, positional relationship, and the like based on the principle.

CONCLUSION

According to a first aspect of disclosed in the above first to fifth embodiments and a part or all of the other embodiments, vehicle air conditioner includes: a casing that causes an air flow introduced from an air introduction port to flow into a vehicle interior, a heater core that heats the air flow by a heat exchange between the air flow in the casing and a heat medium, an electric heater that heats the air flow introduced into the casing from the air introduction port by an electric power, and a determiner that determine whether a temperature of the heat medium is equal to or lower than a predetermined temperature based on a detection value of a temperature sensor that detects a temperature of the heat medium. When the determiner determines that the temperature of the heat medium is equal to or lower than the predetermined temperature, the air flow introduced into the casing from the air introduction port flows toward the vehicle interior without passing through the heater core, and the air flow heated by the electric heater flows toward the vehicle interior.

Furthermore, according to a second aspect, when the air mix door controller controls the air mix door, the air flow introduced into the casing from the air introduction port flows through the bypass flow channel toward the vehicle interior. As a result, the air flow introduced into the casing from the air introduction port flows toward the vehicle interior without passing through the heater core.

As a result, the air flow flows through the bypass flow channel, thereby being capable of reducing a pressure loss. Power saving and noise reduction can be achieved.

According to a third aspect, when the switching door controller controls the inside-outside air switch door, the air flow introduced into the casing from the inside air introduction port passes through the bypass flow channel and flows toward the vehicle interior, to thereby flow toward the vehicle interior without passing through the heater core.

As a result, the air flow introduced into the casing from the inside air introduction port passes through the bypass flow channel and is blown into the vehicle interior, and the blown air flow is introduced into the casing from the inside air introduction port and heated by the electric heater in a repetitive manner. For that reason, the temperature of the air flow blown out from the casing into the vehicle interior can be further increased.

According to a fourth aspect, the electric heater heats the air flow introduced into the casing from the air introduction port by inductive heating of the support portion caused by a magnetic field generated from a coil.

As a result, since the electric heater can be configured by leveraging the support portion of the fan, the size of the electric heater can be reduced as compared with a case where the electric heater is separated from the fan.

According to a fifth aspect, when the inside air door controller controls the inside air door, the air flow introduced into the casing through the inside air opening passes through the air flow channel and the fan and flows toward the vehicle interior. As a result, the air flow introduced into the casing from the inside air opening flows toward the vehicle interior without passing through the heater core.

As a result, the air flow introduced into the casing through the inside air opening passes through the air flow channel and is blown into the vehicle interior, and the blown air flow is introduced into the casing through the inside air opening and heated by the electric heater in a repetitive manner. For that reason, the temperature of the air flow blown out from the casing into the vehicle interior can be further increased.

According to a sixth aspect, when the inside air door controller controls the inside air door, the air flow introduced into the casing through the inside air opening passes through the bypass flow channel and the fan and flows toward the vehicle interior. As a result, the air flow introduced into the casing from the inside air opening flows toward the vehicle interior without passing through the heater core.

As a result, the air flow introduced into the casing through the inside air opening passes through the bypass flow channel and is blown into the vehicle interior, and the blown air flow is again introduced into the casing through the inside air opening and heated by the electric heater in a repetitive manner. For that reason, the temperature of the air flow blown out from the casing into the vehicle interior can be further increased.

According to a seventh aspect, when the inside air door controller controls the inside air door, the air flow introduced into the casing through the inside air opening passes through the air flow channel between the bypass flow channel and the cooling heat exchanger, the bypass flow channel, and the fan and flows toward the vehicle interior. As a result, the air flow introduced into the casing from the inside air opening flows toward the vehicle interior without passing through the heater core.

As a result, the air flow introduced into the casing through the inside air opening passes through the bypass flow channel and is blown into the vehicle interior, and the blown air flow is again introduced into the casing through the air flow channel between the bypass flow channel and the cooling heat exchanger and the bypass flow channel and heated by the electric heater in a repetitive manner. For that reason, the temperature of the air flow blown out from the casing into the vehicle interior can be further increased.

According to an eighth aspect, the electric heater heats the air flow introduced into the casing from the air introduction port by inductive heating of the support portion caused by a magnetic field generated from a coil.

As a result, since the electric heater can be configured by leveraging the support portion of the fan, the size of the electric heater can be reduced as compared with a case where the electric heater is separated from the fan.

According to a ninth aspect, a cooling terminator is provided and stops the compressor to stop the supply of the refrigerant from the compressor to the cooling heat exchanger when the determiner determines that the temperature of the heat medium is equal to or lower than the predetermined temperature.

As a result, when the determiner determines that the temperature of the heat medium is equal to or lower than the predetermined temperature, the compressor is stopped to stop the supply of the refrigerant to the cooling heat exchanger. For that reason, the air flow is prevented from being cooled by the cooling heat exchanger when the air flow passes through the cooling heat exchanger. For that reason, the temperature of the air flow blown out from the casing into the vehicle interior can be further increased.

According to a tenth aspect, when the switching door controller controls the inside-outside air switch door and the air mix door controller controls the air mix door, the air flow introduced into the lower air flow channel through the inside air opening passes through the bypass flow channel in the lower air flow channel and flows toward the vehicle interior. As a result, the air flow introduced into the lower air flow channel from the air introduction port flows toward the vehicle interior without passing through the heater core.

As a result, the air flow introduced into the lower air flow channel through the inside air opening passes through the bypass flow channel in the lower air flow channel and is blown out into the vehicle interior, and the blown air flow is introduced into the lower air flow channel through the inside air opening and heated by the electric heater in the repetitive manner. For that reason, the temperature of the air flow blown out from the casing into the vehicle interior can be further increased.

According to an eleventh aspect, the electric heater heats the air flow introduced into the casing from the air introduction port by inductive heating of the support portion caused by a magnetic field generated from a coil.

As a result, since the electric heater can be configured by leveraging the support portion of the fan, the size of the electric heater can be reduced as compared with a case where the electric heater is separated from the fan.

According to a twelfth aspect, a valve controller is provided and controls the open-close valve so as to close the circulation flow channel when the determiner determines that the temperature of the heat medium is equal to or lower than the predetermined temperature.

As a result, when the determiner determines that the temperature of the heat medium is equal to or lower than the predetermined temperature, the valve controller controls the open-close valve so as to close the circulation flow channel. As a result, since the low temperature heat medium is not supplied to the heater core, the air flow is prevented from being cooled by the heater core.

What is claimed is:

1. A vehicle air conditioner comprising:
a casing configured to allow an air flow introduced from an air introduction port to pass through the casing toward a vehicle interior;
a heater core configured to heat the air flow by heat exchange between the air flow in the casing and a heat medium;
an electric heater configured to heat the air flow introduced into the casing from the air introduction port by an electric power;
a determiner configured to determine whether a temperature of the heat medium is equal to or lower than a predetermined temperature based on a detection value of a temperature sensor that detects the temperature of the heat medium,
an air mix door; and
an air mix door controller configured to control the air mix door, wherein
when the determiner determines that the temperature of the heat medium is equal to or lower than the predetermined temperature, the airflow introduced into the casing from the air introduction port flows toward the vehicle interior without passing through the heater core, and the air flow heated by the electric heater flows toward the vehicle interior,
the casing includes a bypass flow channel configured to allow the air flow introduced from the air introduction port to bypass the heater core and flow toward the vehicle interior through the bypass flow channel,
a fan disposed downstream of the heater core and the bypass flow passage in an air flow direction in the casing and configured to generate an air flow introduced into the casing from the air introduction port and flowing toward the vehicle interior;
the air mix door closes one of an air inlet of the heater core and the bypass flow channel while the air mix door opens another of the air inlet of the heater core and the bypass flow channel,
the air mix door controller controls the air mix door to close the air inlet of the heater core and open the bypass flow channel when the determiner determines that the temperature of the heat medium is equal to or lower than the predetermined temperature, and
when the air mix door controller controls the air mix door, the air flow introduced into the casing from the air introduction port flows toward the vehicle interior through the bypass flow channel, and the air flow introduced into the casing from the air introduction port flows toward the vehicle interior without passing through the heater core.

2. The vehicle air conditioner according to claim 1, comprising:
an inside-outside air switch door configured to close one of an inside air introduction port and an outside air introduction port while the inside-outside air switch door opens another of the inside air introduction port and the outside air introduction port, the inside air introduction port being the air introduction port through which an air flow is introduced into the casing from the vehicle interior, the outside air introduction port being a port through which an air flow is introduced into the casing from a vehicle exterior; and
a switching door controller configured to control the inside-outside air switch door to open the inside air introduction port and close the outside air introduction port when the determiner determines that the temperature of the heat medium is equal to or lower than the predetermined temperature, and
when the switching door controller controls the inside-outside air switch door, the air flow introduced into the casing from the inside air introduction port flows toward the vehicle interior through the bypass flow channel and flows toward the vehicle interior without passing through the heater core.

3. The vehicle air conditioner according to claim 1, comprising:
the fan including a plurality of blades which rotate in accordance with rotation of a rotation shaft and generate an air flow introduced into the casing from the air introduction port to flow toward the vehicle interior through the casing, and a support portion made of a conductor and supporting the plurality of blades; and
a coil separated from the support portion and configured to generate a magnetic field based on an output current of an alternating-current output circuit which outputs an alternating current, wherein
the electric heater heats the air flow introduced into the casing from the air introduction port by inductive heating of the support portion caused by the magnetic field generated from the coil.

4. The vehicle air conditioner according to claim 1, comprising:
an inside-outside air switch door configured to open one of an inside air introduction port and an outside air introduction port, the inside air introduction port being a port through which an air flow is introduced into the casing from the vehicle interior, the outside air introduction port being a port through which an airflow is introduced into the casing from a vehicle exterior;
a cooling heat exchanger disposed in the casing and configured to cool the air flow introduced into the casing from one of the inside air introduction port and the outside air introduction port;
the heater core configured to heat the air flow by heat exchange between air which has passed through the cooling heat exchanger and the heat medium;
an inside air door configured to open and close an inside air opening through which an airflow channel between the bypass flow channel and the fan in the casing communicates with the vehicle interior, the inside air opening being the air introduction port through which the air flow is introduced from the vehicle interior to the air flow channel; and
an inside air door controller configured to control the inside air door to open the inside air opening when the determiner determines that the temperature of the heat medium is equal to or lower than the predetermined temperature, wherein
when the inside air door controller controls the inside air door, the air flow introduced into the casing through the inside air opening passes through the air flow channel and the fan and flows toward the vehicle interior, and the air flow introduced into the casing from the inside air opening flows toward the vehicle interior without passing through the heater core.

5. The vehicle air conditioner according to claim 1, comprising:
an inside-outside air switch door configured to open one of an inside air introduction port and an outside air introduction port, the inside air introduction port being a port through which an air flow is introduced into the casing from the vehicle interior, the outside air introduction port being a port through which an airflow is introduced into the casing from a vehicle exterior;

a cooling heat exchanger disposed in the casing and configured to cool the air flow introduced into the casing from one of the inside air introduction port and the outside air introduction port;

the heater core configured to heat the air flow by heat exchange between air which has passed through the cooling heat exchanger and the heat medium;

an inside air door configured to open and close an inside air opening through which the bypass flow channel in the casing communicates with the vehicle interior, the inside air opening being the air introduction port through which the air flow is introduced from the vehicle interior to the bypass flow channel in the casing; and an inside air door controller configured to control the inside air door to open the inside air opening when the determiner determines that the temperature of the heat medium is equal to or lower than the predetermined temperature, wherein when the inside air door controller controls the inside air door, the air flow introduced into the casing through the inside air opening passes through the bypass flow channel and the fan and flows toward the vehicle interior, and the air flow introduced into the casing from the inside air opening flows toward the vehicle interior without passing through the heater core.

6. The vehicle air conditioner according to claim 1, comprising:

an inside-outside air switch door configured to open one of an inside air introduction port and an outside air introduction port, the inside air introduction port being a port through which an air flow is introduced into the casing from the vehicle interior, the outside air introduction port being a port through which an airflow is introduced into the casing from a vehicle exterior;

a cooling heat exchanger disposed in the casing and configured to cool the air flow introduced into the casing from one of the inside air introduction port and the outside air introduction port;

the heater core configured to heat the air flow by heat exchange between air which has passed through the cooling heat exchanger and the heat medium;

an inside air door configured to open and close an inside air opening through which an air flow channel between the bypass flow channel and the cooling heat exchanger in the casing communicates with the vehicle interior, the inside air opening being the air introduction port through which the air flow is introduced from the vehicle interior to the air flow channel between the bypass flow channel and the cooling heat exchanger; and an inside air door controller configured to control the inside air door to open the inside air opening when the determiner determines that the temperature of the heat medium is equal to or lower than the predetermined temperature, wherein when the inside air door controller controls the inside air door, the air flow introduced into the casing through the inside air opening passes through the air flow channel between the bypass flow channel and the cooling heat exchanger and through the bypass flow channel and the fan toward the vehicle interior, and the air flow introduced into the casing from the inside air opening flows toward the vehicle interior without passing through the heater core.

7. The vehicle air conditioner according to claim 4, comprising a coil configured to generate a magnetic field based on an output current of an alternating-current output circuit which outputs an alternating current, wherein the fan includes a plurality of blades which rotate in accordance with rotation of a rotation shaft and generate an air flow introduced into the casing from the air introduction port to flow toward the vehicle interior through the casing, and a support portion supporting the plurality of blades, the coil is separated from the support portion, and the electric heater heats the air flow introduced into the casing from the air introduction port by inductive heating of the support portion caused by the magnetic field generated from the coil.

8. The vehicle air conditioner according to claim 4, comprising:

a compressor configured to draw a refrigerant from a refrigerant outlet of the cooling heat exchanger and compress and discharge the refrigerant, the compressor and the cooling heat exchanger constituting a vapor compression refrigeration cycle in which the refrigerant circulates; and a cooling terminator configured to stop the compressor and terminate supply of the refrigerant from the compressor to the cooling heat exchanger when the determiner determines that the temperature of the heat medium is equal to or lower than the predetermined temperature.

9. A vehicle air conditioner comprising:

a casing configured to allow an air flow introduced from an air introduction port to pass through the casing toward a vehicle interior;

a heater core configured to heat the air flow by heat exchange between the air flow in the casing and a heat medium;

an electric heater configured to heat the air flow introduced into the casing from the air introduction port by an electric power;

a determiner configured to determine whether a temperature of the heat medium is equal to or lower than a predetermined temperature based on a detection value of a temperature sensor that detects the temperature of the heat medium, an inside-outside air switch door configured to open one of an inside air introduction port and an outside air introduction port, the inside air introduction port being the air introduction port through which an air flow is introduced into the casing from the vehicle interior, the outside air introduction port being a port through which an air flow is introduced into the casing from a vehicle exterior; and a switching door controller configured to control the inside-outside air switch door;

an air mix door disposed in the casing; and an air mix door controller configured to control the air mix door, wherein when the determiner determines that the temperature of the heat medium is equal to or lower than the predetermined temperature, the airflow introduced into the casing from the air introduction port flows toward the vehicle interior without passing through the heater core, and the air flow heated by the electric heater flows toward the vehicle interior the casing includes an upper air flow channel configured to allow the air flow introduced from at least one of the inside air introduction port and the outside air introduction port to pass through the upper air flow channel toward the vehicle interior, and a lower air flow channel disposed downward of the upper air flow channel in a vertical direction and configured to allow the air flow introduced from at least one of the inside air introduction port and the outside air introduction port to pass through the lower air flow channel toward the vehicle interior, the heater core and the electric heater are disposed in the lower air flow channel, the lower air flow channel includes a bypass flow channel configured to allow the air flow introduced from one of the inside air introduction port and the outside air introduction port to bypass the heater core and flow toward the vehicle interior through the bypass flow channel, a fan disposed downstream of the heater core and the bypass flow passage in an air flow direction in the casing and configured to generate an air flow introduced into the casing from the air introduction port and flowing toward the vehicle interior;

the air mix door closes one of an air inlet of the heater core and the bypass flow channel in the lower air flow channel while the air mix door opens another of the air inlet of the heater core and the bypass flow channel, when the determiner determines that the temperature of the heat medium is equal to or lower than the predetermined temperature, the switching door controller controls the inside-outside air switch door to introduce the air flow into the lower air flow channel through the inside air introduction port, and the air mix door controller controls the air mix door to close the air inlet of the heater core and open the bypass flow channel, and when the switching door controller controls the inside-outside air switch door, and the air mix door controller controls the air mix door, the air flow introduced into the lower air flow channel through the inside air opening passes through the bypass flow channel of the lower air flow channel toward the vehicle interior, and the air flow introduced into the lower air flow channel from the air introduction port flows toward the vehicle interior without passing through the heater core.

10. The vehicle air conditioner according to claim 9, comprising:

the fan including a plurality of blades which rotate in accordance with rotation of a rotation shaft and generate an air flow introduced into the lower air flow channel from the air introduction port to flow toward the vehicle interior through the lower air flow channel, and a support portion supporting the plurality of blades; and a coil separated from the support portion and configured to generate a magnetic field based on an output current of an alternating-current output circuit which outputs an alternating current, wherein the electric heater heats the air flow introduced into the casing from the air introduction port by inductive heating of the support portion caused by the magnetic field generated from the coil.

11. The vehicle air conditioner according to claim 1, comprising:

the heater core configured to heat the air flow by heat exchange between the air flow and the heat medium which cools a for-traveling engine;

an open-close valve configured to open and close a circulation flow channel through which the heat medium circulates between the heater core and the for-traveling engine; and a valve controller configured to control the open-close valve to close the circulation flow channel when the determiner determines that the temperature of the heat medium is equal to or lower than the predetermined temperature.

12. A vehicle air conditioner comprising:

a casing configured to allow an air flow introduced from an air introduction port to pass through the casing toward a vehicle interior;

a heater core configured to heat the air flow by heat exchange between the air flow in the casing and a heat medium;

an electric heater configured to heat the air flow introduced into the casing from the air introduction port by an electric power; and a determiner configured to determine whether a temperature of the heat medium is equal to or lower than a predetermined temperature based on a detection value of a temperature sensor that detects the temperature of the heat medium, wherein the casing includes a bypass flow channel configured to allow the air flow introduced from the air introduction port to bypass the heater core and flow toward the vehicle interior through the bypass flow channel, and a fan disposed downstream of the heater core and the bypass flow passage in an air flow direction in the casing and configured to generate an air flow introduced into the casing from the air introduction port and flowing toward the vehicle interior;

when the determiner determines that the temperature of the heat medium is equal to or lower than the predetermined temperature, the airflow introduced into the casing from the air introduction port is regulated such that a flow rate of an air flow passing through the bypass flow channel toward the vehicle interior is larger than a flow rate of an airflow passing through the heater core toward the vehicle interior, the electric heater is positioned downstream of the heater core in an air flow direction and heats the air flow introduced into the casing from the air introduction port, and when the determiner determines that the temperature of the heat medium is equal to or lower than the predetermined temperature, the air flow that has passed through the bypass flow channel is heated by the electric heater and flows toward the vehicle interior.

13. The vehicle air conditioner according to claim 12, wherein when the determiner determines that the temperature of the heat medium is equal to or lower than the predetermined temperature, the air flow passing through the bypass flow channel is heated by the electric heater and flows toward the vehicle interior.

* * * * *